INVENTOR.
MERRILL D. MARTIN
BY George B White
ATTORNEYS

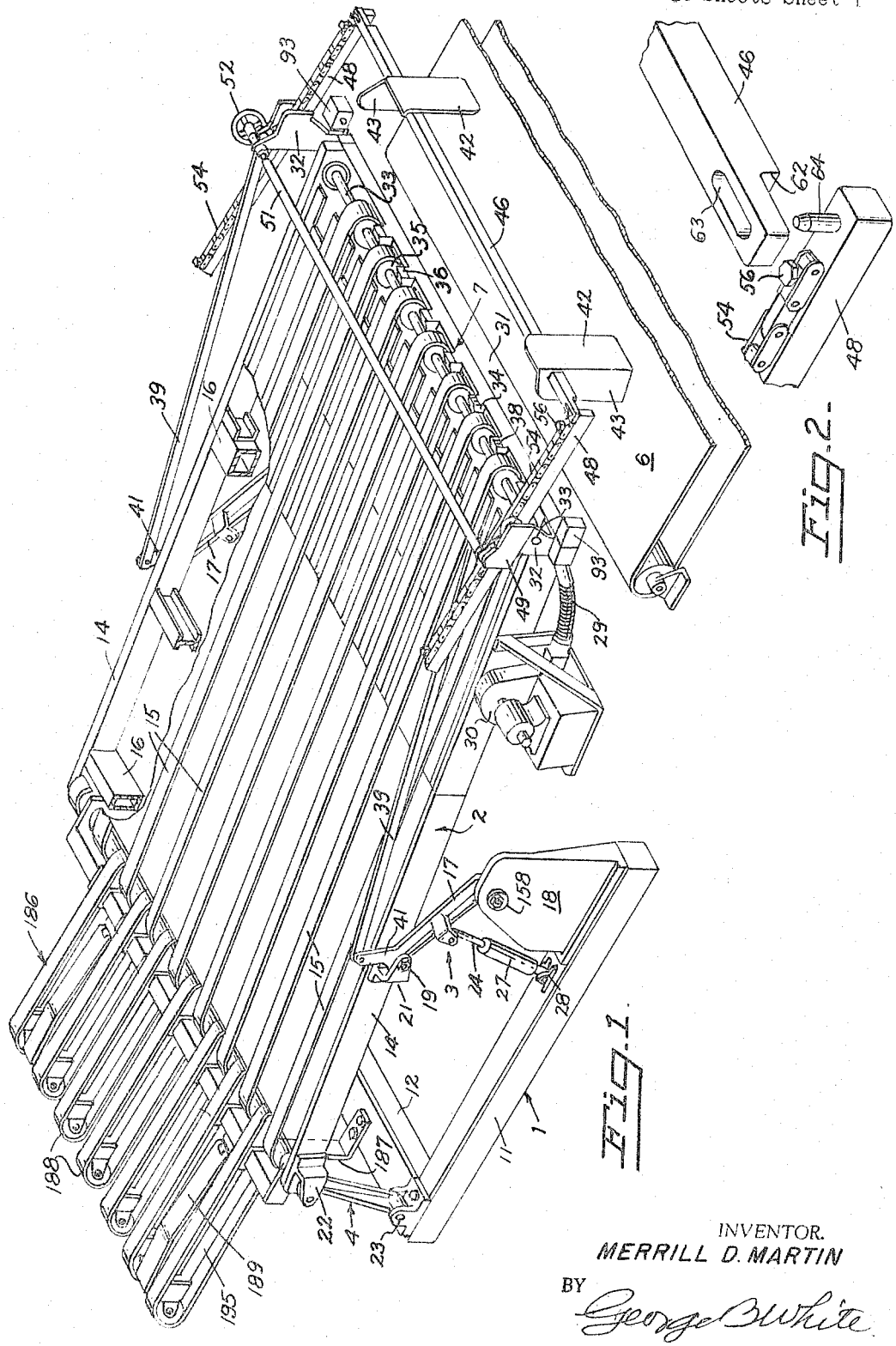

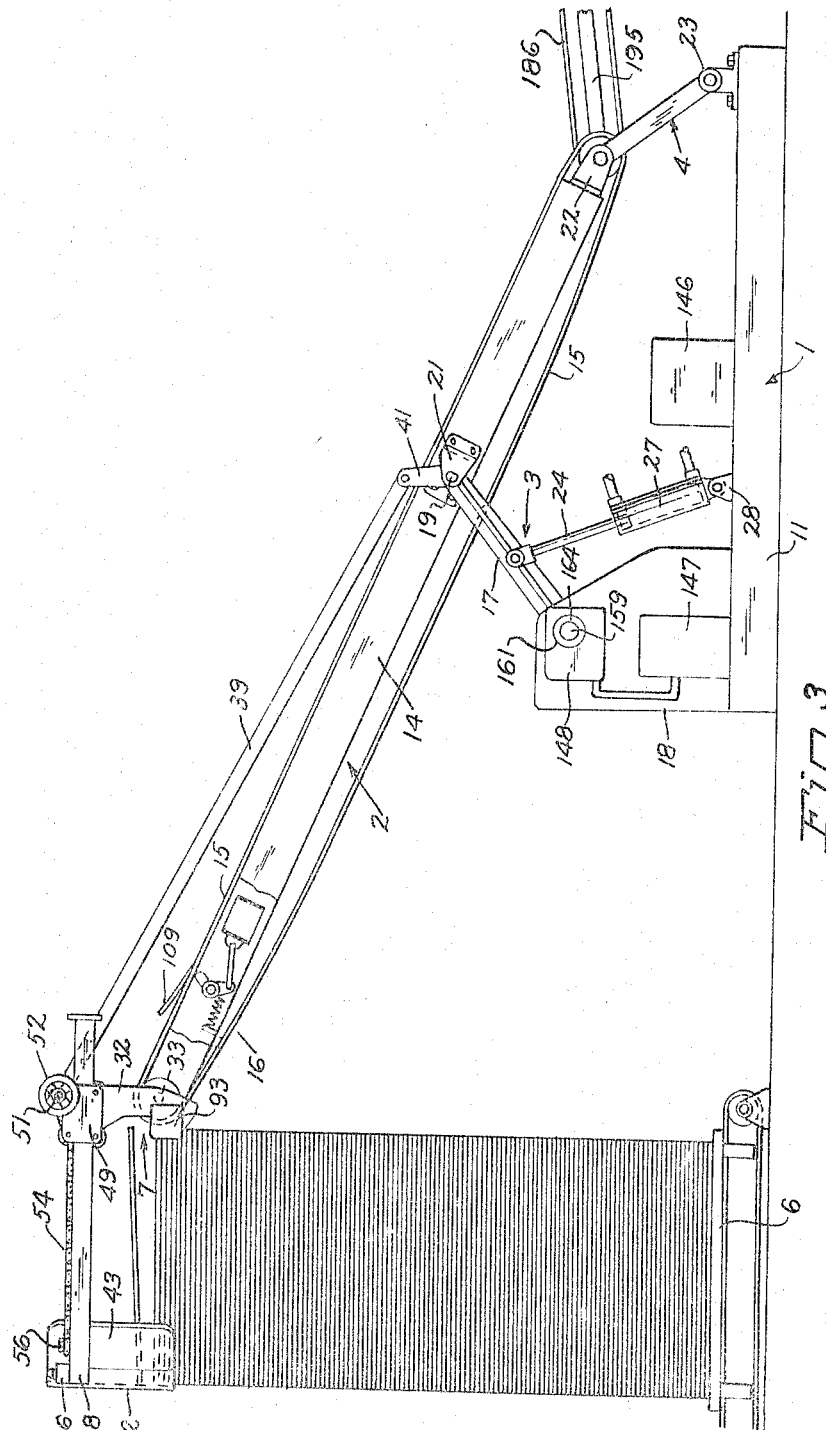

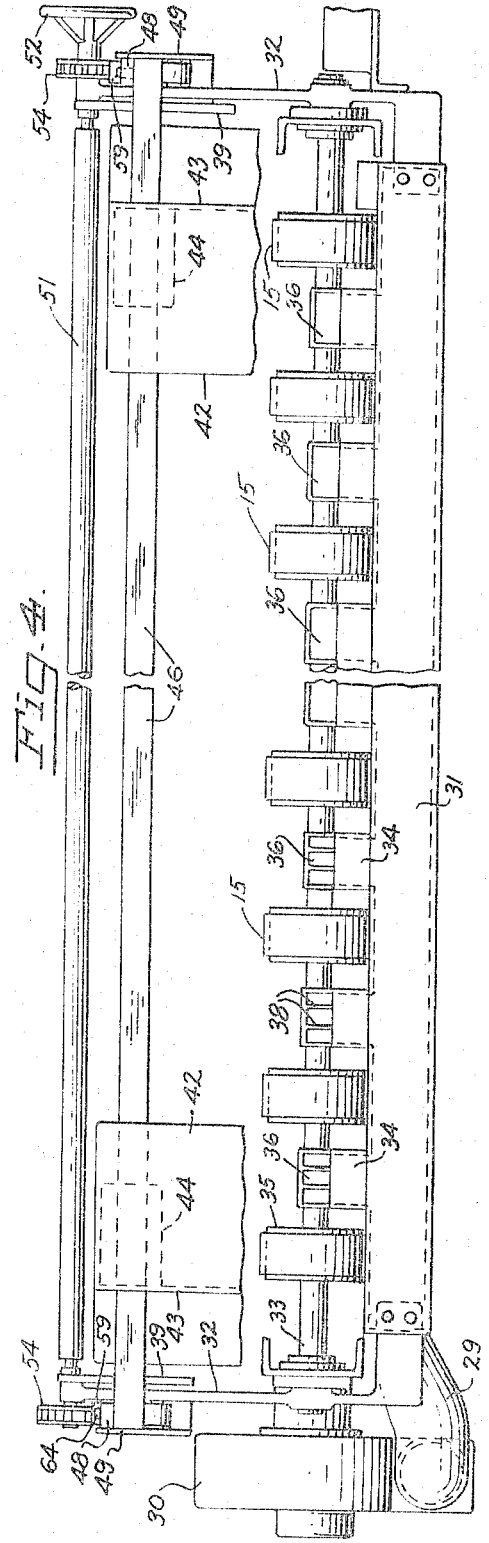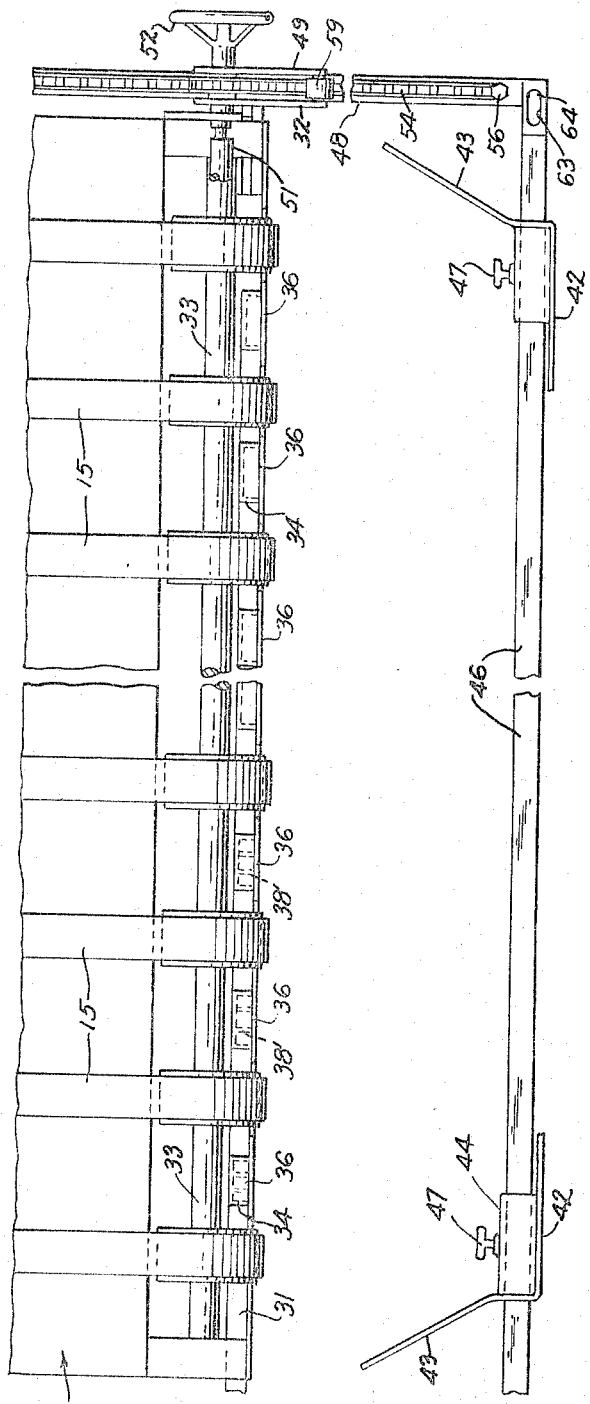

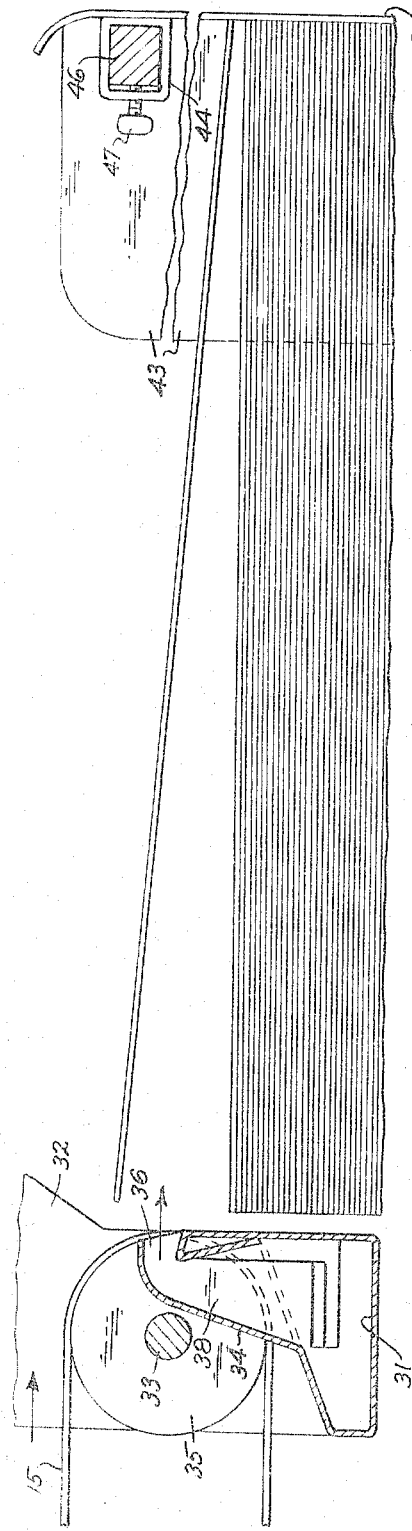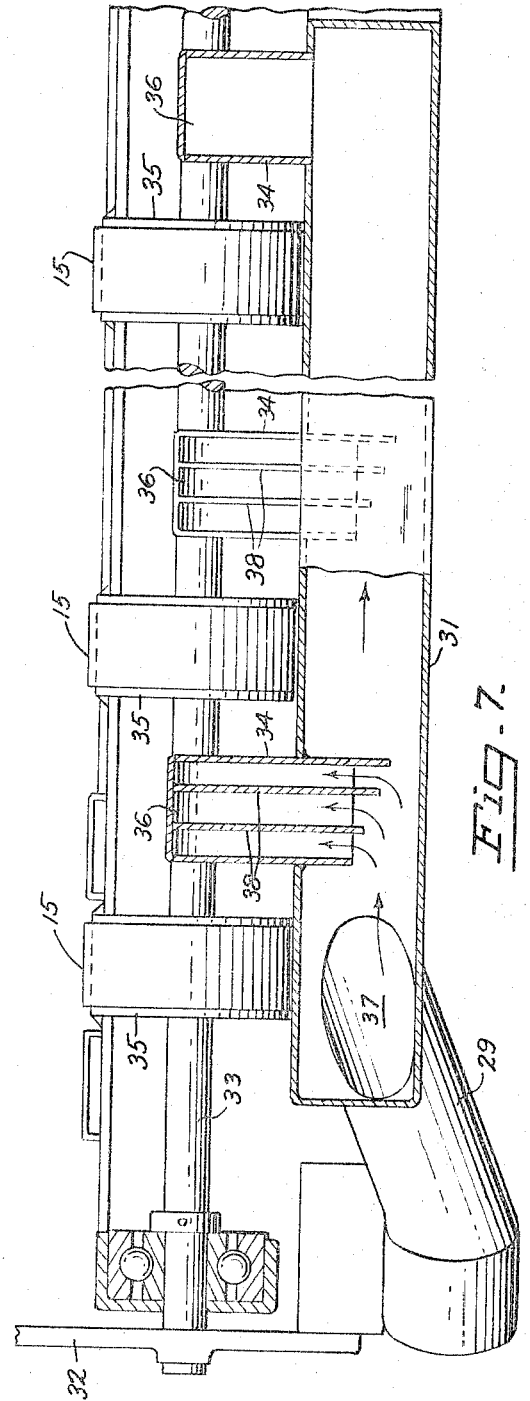

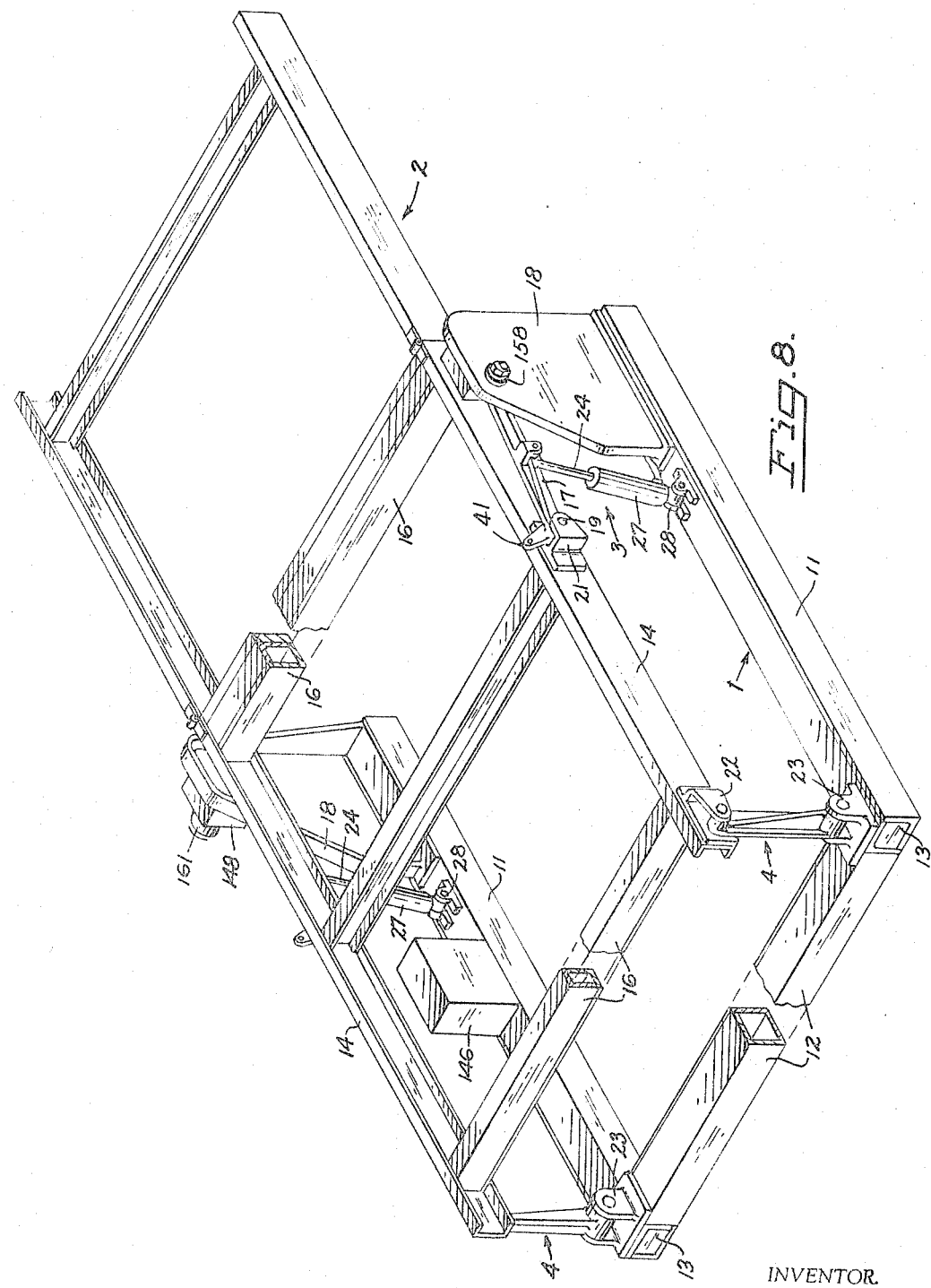

Fig. 11.

INVENTOR.
MERRILL D. MARTIN
BY George B. White
ATTORNEY

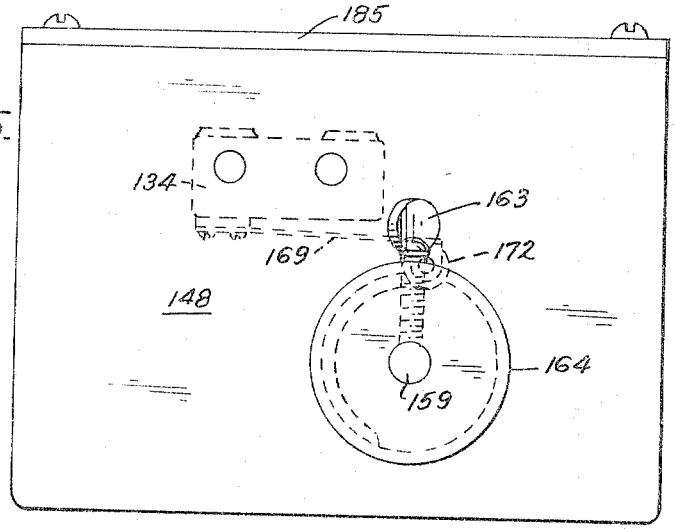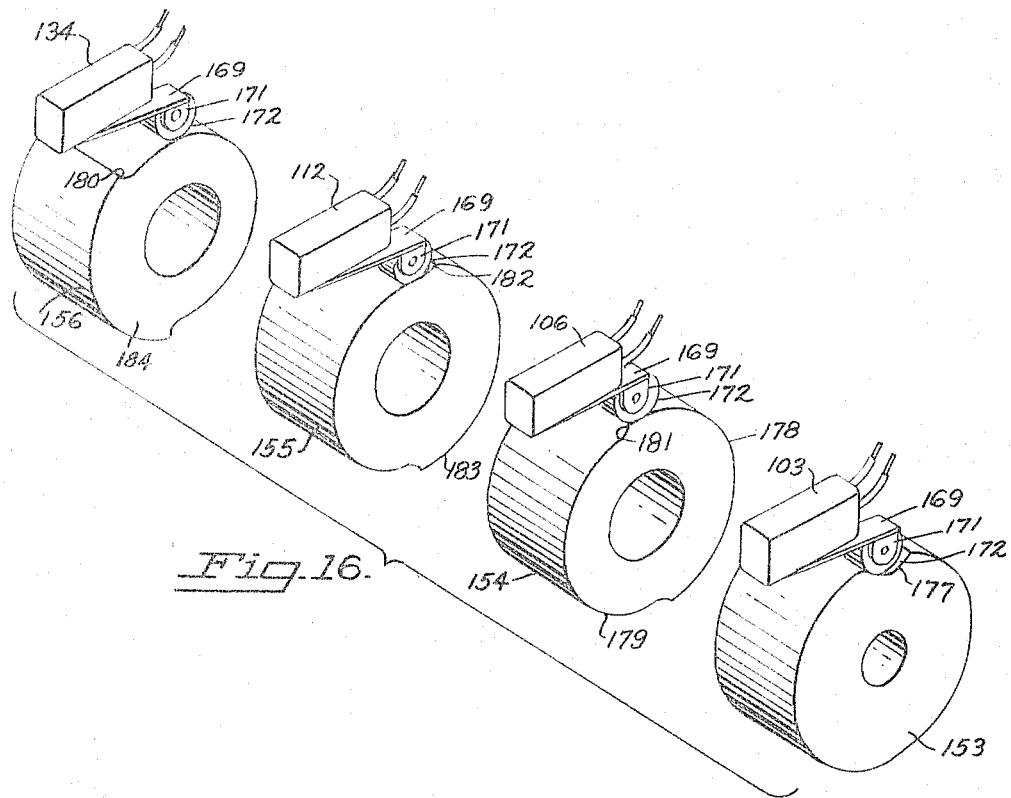

United States Patent Office 3,321,202
Patented May 23, 1967

3,321,202
AUTOMATIC SHEET STACKERS
Merrill D. Martin, Oakland, Calif.
(1250 67th St., Emeryville, Calif. 94608)
Filed May 3, 1965, Ser. No. 452,483
39 Claims. (Cl. 271—68)

This invention relates to automatic sheet stackers.

This invention is an improvement on the type of automatic sheet stacker apparatus shown in United States Patent 2,901,250, issued on Aug. 25, 1959, to George M. Martin.

The improvements of the apparatus of this invention reside in the structure of both the base of the machine and the swinging frame so as to minimize torsional twist or misalignment; and in the provision of a device for providing an air cushion above the stacked sheets so as to gradually ease the depositing of the sheets on the stack thereby to prevent smearing of the printing on the sheets and further in the provision of means for providing such air cushion which is raised and lowered by and with the discharge end of the stacker frame, means being provided to maintain the cushion at a constant angle relatively to the stacked sheets or the ground.

Another feature of the invention is the provision of abutments or guides traveling with the air cushion forming means to positively locate each sheet in registry with the stack below the sheet.

Another feature of the invention is the provision of synchronized means for raising and lowering of the discharge end of the stacker frame so that said discharge end moves on a substantially perpendicular plane, compensation being provided for the usual arcuate path of such swinging of the frame.

Another feature of the invention is to provide a continuously automatically operated stacker apparatus in which the sheets are fed so as to be deposited into an aligned stack, wherein the rising of the stacker is co-ordinated with and is in accordance with the height of the stack; and wherein means are provided to carry away sheets stacked to a pre-determined height after the stack is formed, and wherein electrical valve control means are actuated by the changing angular position of a swinging stacker frame for the raising of the frame until sheets are stacked to a pre-determined height, thereafter to stop the conveying of sheets from the stacker but raising the stacker so that its parts clear the top of the stack and then actuating a conveyor to carry away the stack of sheets; and finally after the stack of sheets is so carried to a pre-determined distance or period to actuate the controls for lowering the stacker frame and to begin the stacking of sheets into another stack, the controls being partly mechanical, partly electrical and partly hydraulic.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a perspective view of the automatic stacker viewing it from the stacking end.

FIG. 2 is a fragmental perspective sub-assembly view showing the connection of the guide elements to the adjusting members.

FIG. 3 is a side view of the stacking apparatus at about the top of its stacking attitude.

FIG. 4 is a fragmental end view of the air cushion producing device on the end of the stacker.

FIG. 5 is a fragmental top plan view of the device on the end of the stacker for producing the air cushion.

FIG. 6 is a fragmental, partly sectional view of the sheet aligning parts of the stacker and the air-cushion producing device at the top of the stack of sheets.

FIG. 7 is a partly sectional front view of the air-cushioning device under the sheet conveyors of the stacker frame.

FIG. 8 is a perspective view of the base and the stacker frame supported thereon.

FIG. 11 is a fluid control flow diagram for the stacker.

FIG. 15 is an end view of the cambox.

FIG. 16 is a diagrammatic perspective developed view of the cams and switches.

Figure 9:
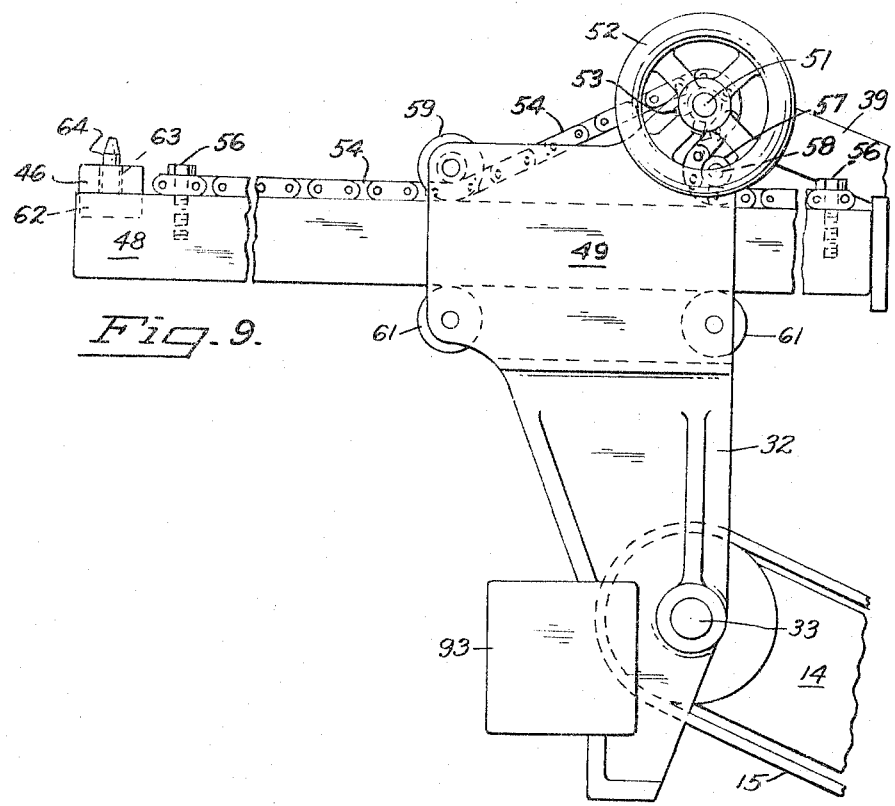
FIG. 9 is a subassembly side view of the support for the sheet aligning elements.

The stacker apparatus of this invention includes a base 1 on which is swingably supported a conveyor or stacker frame 2 partly by an adjustable raising and lowering mechanism 3 connected to about the middle of the conveyor frame 2 and by a compensating lever device 4 at the intake end of the apparatus. Under the outlet end of the stacker frame 2 is a delivery conveyor 6 which is co-ordinated with the position of the stacker frame 2. An air cushion producing device 7 is mounted on the discharge end of the stacker conveyor frame 2 to produce an air cushion on the top of the stack for cushioning the depositing of the sheet on the stack.

*The base*

The base 1 includes a pair of heavy side members 11 connected by a transverse member 12 at one end and being open at the other end. Thus the base is generally U-shaped. Each side member 11 and the transverse member 12 is tubular, in this illustration of rectangular cross-section. Into each end of each side member 11 and the transverse member 12 there is welded a transverse stiffening plate 13 which prevents torsional forces from twisting the base members 11 and 12 and thereby enables the base 1 to maintain its initial alignment at all times and under all loads.

*The stacker device*

The stacker device includes the stacker conveyor frame 2 which in this illustration is made in two sections hinged together as shown in FIG. 8. The longitudinal sides 14 of the stacker conveyor frame are made of channels with the open sides facing one another. Spaced transverse braces 16 are fixed between the longitudinal sides 14 and are made tubular, in this illustration of rectangular cross-section. A conveyor frame so constructed maintains its shape as against the maximum torsional or other forces to which it may be subjected in the operation of the stacker apparatus.

On the stacker conveyor frame 2 are spaced sheet conveyors 15 supported longitudinally on the frame 2 and operated in the manner described in the aforesaid Martin Patent No. 2,901,250. There is also provided, as shown in FIG. 3, a suitable slat brake 16 of the kind described in said Martin Patent No. 2,901,250 for stopping the movement of sheets on said conveyors 15.

Raising and lowering device

The raising and lowering device 3 is connected to lever arms 17 as shown in FIGS. 1, 3 and 8. One end of each lever arm 17 is pivotally supported on an adjacent bracket plate 18, which latter is fixed to the adjacent side member 11 of the base 1. The other end of each lever arm 17 is connected by a pivot 19 to a yoke bracket 21 fixed on the outside of the adjacent longitudinal side 14 of the stacker conveyor frame 2.

The intake end of the stacker conveyor frame 2 has another yoke bracket 22 in which is pivoted the upper end of the of the compensating lever 4. The lower end of the lever 4 is journalled in a bracket 23 on the adjacent side 11 of the base 1. As the longitudinal sides 14 of the frame 2 are raised or lowered relatively to the brackets 22, the compensating levers 4 are swung in proportion with the arc of movement of the pivot 19 on the end of the raising lever 17, as described in the aforesaid Martin patent, for maintaining the discharge end of the stacker conveyor frame in the same vertical plane during its entire movement from the lowermost to its top position.

To each lever arm 17 is pivotally connected a piston rod 24 of a piston 26 which latter works in a cylinder 27. The closed end of the cylinder 27 is fulcrumed in a journal bracket 28 on the adjacent side member 11 of the base 1. As the pressure medium is admitted into the closed end of the cylinders 27 it will move the pistons 26 and thereby will push the respective levers 17 upwardly around the journals in the respective bracket plates 18. Inasmuch as the lever arms 17 extend toward the intake end of the stacker conveyor frame 2 and toward the compensating arms 4, the stacker conveyor frame 2 is swung upwardly and the discharge end thereof travels on a substantially vertical plane, in the manner described in said Martin Patent No. 2,901,250.

The control of the pressure medium to and from the cylinders 27, and for co-ordinating the operation of the braking slats for stopping the sheets at the highest position of the stacker conveyor frame 2, and for raising and lowering the sheets at pre-determined intervals is controlled by an electrically actuated hydraulic system hereinafter to be described.

The air cushion and sheet guiding device

During the stacking of the sheets the delivery conveyor 6 is at a standstill. As the sheets are delivered from the discharge ends of the sheet conveyors 15 they are above an air cushion created beyond the discharge ends of the sheet conveyors 15. The device for creating such an air cushion, in the manner shown in FIGS. 3 and 6, is combined with adjustable guides to locate each sheet in proper registry with the other sheets in the stack.

The structural details of the cushion creating and guiding device are shown in FIGS. 4, 5, 6 and 7.

A manifold extends across and beneath the discharge end of the sheet conveyors 15 as shown in FIGS. 4 and 5. This manifold 31 is mounted at each end on a pivoted bracket plate 32, which latter is journalled on a conveyor shaft 33 on which the pulleys 35 for the discharge end of the sheet conveyors 15 are mounted. Thus the manifold 31 is raised and lowered together with the discharge end of the stacker conveyor frame 2. An outlet nozzle 34 extends from the manifold 31 into each space between each pair of adjacent sheet conveyors 15. Each outlet nozzle 34 extends upwardly from the manifold 31 and has an outlet opening 36 directed away from the conveyors 15 so as to discharge compressed air under the sheets sliding off the sheet conveyors 15. The outlet openings 36 are spaced above the manifold 31 and are located about in line with the axis of the conveyor pulleys 34.

In order to assure substantially even discharge of the compressed air through all the outlet nozzle 34, the outlet nozzles nearest to the intake 37 of the manifold 31 are provided with deflecting baffles 38. The wall of the outlet nozzle 34 farthest from the intake 37 forms a baffle 38 extending deepest into the manifold 31 and in the path of the air flowing from the intake 37 along the manifold 31. Two additional baffles 38 spaced from the end wall baffle 38 are gradually shorter toward the intake 37. These baffles 38 extend to the top of the outlet nozzle 34. This use of baffles for deflecting air flow into the outlet nozzles is repeated at each outlet nozzle 34 up to about the middle of the manifold and prevents the air flow in the manifold from bypassing the outlet nozzles 34 nearer the intake opening 37.

In order to hold the manifold 31 and the outlet nozzles 34 in such position that the outlet openings 36 face generally horizontally or parallel with the top of the stack, the bracket plates 32 are adjusted about the axis of the conveyor shaft 33 in conformance with the changing of the angular position of the stacker frame 2. A link 39 is pivotally connected to the upper portion of each bracket plate 32. The other end of each link 39 is pivoted to a crank arm 41 as shown in FIG. 1 and FIG. 3. The crank arm 41 extends at a fixed angle from the end of each lever arm 17, which angle is pre-determined to co-operate with the length of the link 39 and the bracket plates 32 for turning the bracket plates 32 in the same proportion as the angular position of the stacker frame 2 changes during the operation. In the present illustration, as the stacker conveyor frame 2 is raised from the position shown in FIG. 1 to the position shown in FIG. 3, the links 39 are pushed in the direction of the bracket plates 32 thereby to swing the bracket plates 32 in a clockwise direction viewing FIG. 3 and correspondingly hold the manifold 31 in properly aligned position directing the air flow generally over the top of the stack, and vice versa.

The intake 37 of the manifold 31 is connected by a flexible conduit 29 to a suitable blower 30. In the illustration herein the blower is mounted on the longitudinal side 14 of the stacker conveyor frame 2. The blower is electrically driven in any suitable manner not shown and is controlled by its own switch.

In order to properly locate the sheets on the stack, a pair of spaced, vertical angle guides are supported so as to conform to the respective corners of the stack farthest from the stacker conveyor frame 2. Each angle or corner guide includes an abutment wall 42 facing the ends of the sheet conveyors 15, and a guide wall 43 at an oblique angle to the abutment wall 42 to guide the respective ends of the sheets into proper registering position on top of the stack.

The angle guides are adjustable toward one another to conform to the length of the sheets stacked. As shown on FIG. 5, a hub 44 is formed on each abutment wall 42 and is slidable on a rectangular crossbar 46. A set screw 47 in each hub 44 is used for securing each hub 44 and the angle guide on the crossbar 46 in adjusted position.

The crossbar 46 is supported in spaced relation from the discharge ends of the sheet conveyors 15 by adjusting bars 48. Each adjusting bar 48 is slidable in a yoke 49 formed in the top of each bracket plate 32 as shown in FIGS. 1 and 9. An adjusting shaft 51 is journalled in the top of each yoke 49 of each bracket plate 32 and extends across and above the discharge ends of the sheet conveyors 15. A handle wheel 52 on an end of the adjusting shaft 51 is utilized for turning the adjusting shaft for moving the adjusting bars 48 in the yokes 49. A sprocket 53 is provided on the adjusting shaft 51 in each yoke 49 above each adjusting bar 48. A chain 54 is played over each sprocket 53 and is suitably secured at its opposite ends to the top of the adjacent adjusting bar 48, for instance by a set screw 56, as shown in FIGS. 2 and 9. A roller 57 on a roller shaft 58 is held under the sprocket 53 and bears on the chain 54. Another roller 59 is similarly supported above the chain 54 spaced from the first roller 57 toward the crossbar supporting end of the adjusting bar 48. A pair of similarly spaced rollers 61 in each yoke 49 support the bottom side of each adjusting bar 48. As the handle wheel 52 is turned it shifts the chains 54 and moves the adjusting bars 48 in synchronism to determine the correct spacing of the angle guides from the discharge end of the stacker conveyor frame 2.

In order to prevent damage to this adjusting mechanism in the event the corner guides are caught on the top of the stack, each end of the crossbar 46 has a cut-away portion 62 which fits over the adjacent end of the adjusting bar 48. Each end of the crossbar 46 has in it an elongated slot 63 which engages a pin 64 shown in FIG. 2. Thus the crossbar 46 can be lifted off the adjusting bars 48. If only one end of the crossbar 46 is lifted by accident, then the elongated slot 63 in the other end of the crossbar 46 operates as a fulcrum and slides along the pin 64 to prevent the shearing or bending of the adjusting bar 48.

*The control of lowering and raising of the stacker conveyor frame*

Figure 11:
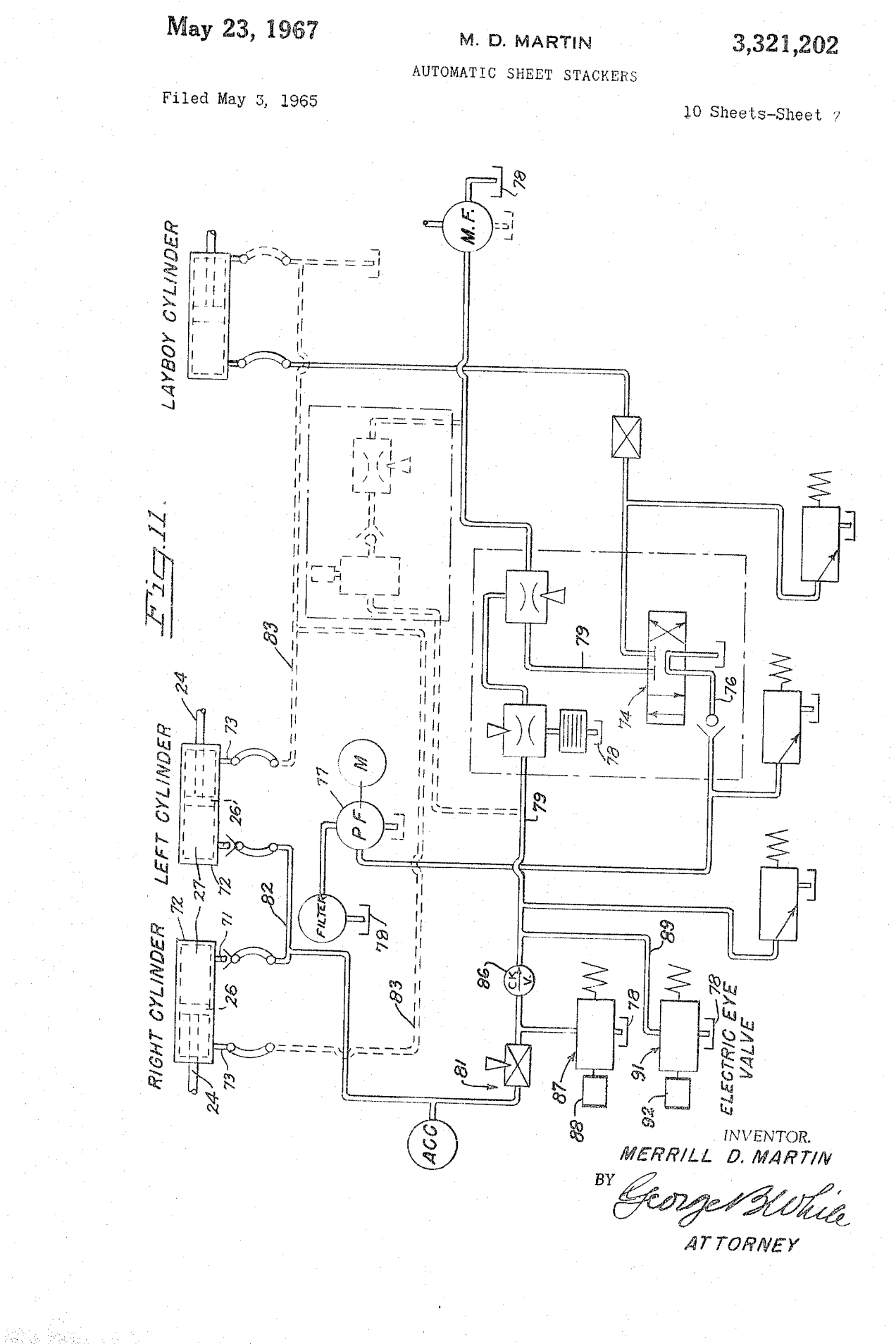

It is important for the proper operation of the stacker device that the control of the pressure medium cause movement of the pistons 26 and the cylinders 27 in synchronism. This is accomplished by suitable valve control as illustrated in the hydraulic flow diagram in FIG. 11. Each cylinder 27 has an intake port 71 near the closed end 72 thereof so that when the fluid under pressure is introduced to the intake port 71 it acts on the piston 26 for moving the piston rod 24 outwardly thereby raising the lever arm 17 in the manner heretofore described for tilting the stacker frame 2 with the conveyors 15 thereon and raising the discharge ends of the sheet conveyors 15 at about the same rate as the sheets are stacked. On the other end of each cylinder 27 there is an outlet port 73 which serves as a vent and also as an outlet for fluids accumulated at that end of the cylinder.

The starting valve 74 is manually set to start the operation of the device. An intake line 76 conducts fluid from a motor-driven pump 77 which draws the liquid from a reservoir 78. This motor is operated by a suitable switch at the same time when the manual valve 74 is opened. In the closed position of the valve 74 the pump fluid is by-passed from the valve 74 to the reservoir 78. A conduit 79 leads from the valve 74, through suitable pressure controls, to an intake conduit system 81, which includes branch conduits 82 connecting to the respective intake ports 71 of the cylinders 27 so as to apply equalized pressure simultaneously in both cylinders 27. Outlet conduits 83 lead from the outlet ports 73 back to the reservoir 78.

In the intake conduit system 81 is inter-connected a check valve 86 for preventing back-flow from the cylinders 26 and thereby holding the stacker conveyor frame 2 in raised or elevated position when needed. On the cylinder side of the check valve 86 is connected a normally closed dump valve 87 leading to the reservoir 78. This dump valve 87 is electrically opened, for instance by a suitable solenoid 88.

Between the check valve 86 and the valve 74 is connected a by-pass conduit 89 which leads to a by-pass valve 91 draining into the reservoir 78. This by-pass valve is normally closed and is controlled by a suitable solenoid 92 so as to by-pass the fluid under pressure from the valve 74 at certain pre-determined times. In the present system the electric circuit for controlling the by-pass valve includes an electric eye device 93, shown in the diagram in FIG. 12.

The electric eye device 93, in this illustration has its opposite members mounted at the opposite ends of the manifold 31 so that the eye beam of the device maintains the same relation to the stack height as that of the manifold 31, as shown in FIGS. 1 and 3.

The electric eye device operates so that the by-pass valve 91 is closed whenever the electric eye beam is broken by sheets on the stack. When the by-pass valve 91 is closed, the fluid under pressure passes through the check valve 86 and the intake system 81 and the branch conduits 82 and into the cylinders 27 and raises the stacker until the portion of the manifold 31 on which the electric eye members are mounted clears the top of the stacked sheets. Thereupon the electric eye beam is uninterrupted and operates the solenoid 92 to open the by-pass valve 91 thereby to by-pass the fluid under pressure ahead of the check valve 86. The pressure exerted by the weight of the stacker conveyor frame 2 on the piston rods 24 and on the pistons 26 closes the check valve 86 whereby the stacker conveyor frame 2 is held in a raised position until the height of the stack again reaches and breaks the electric eye beam and thus deenergizes the solenoid 92 and allows the by-pass valve 91 to close. Whenever the by-pass valve 91 is closed the fluid under pressure flows through the check valve 86 and into the cylinders 27 for raising the stacker conveyor frame 2 as heretofore described.

When the sheets are stacked to a selected height, the stacker conveyor frame 2 is held in a raised position so that the abutment wall 42 is still overlapping the top of the stack. This is due to the fact that the electric eye beam is above the top of the stack. Another switch, to be hereinafter described, is then provided for breaking the circuit of the by-pass solenoid 92, thereby permitting the by-pass valve 91 to close so as to raise the stacker conveyor frame 2 still higher until the abutment wall 42 clears the top of the stack. At this time the conveyor device 6 is actuated in a manner hereinafter described, and carries the stack of sheets away from the stacker conveyor frame 2. After a pre-determined time a circuit closing device, to be hereinafter described, is actuated to energize the solenoid 88, thereby to open the dump valve 87. Inasmuch as the electric eye beam is not interrupted at this time, the by-pass valve 91 is also open so as to permit the weight of the stacker conveyor frame to descend to the initial low position for stacking another stack of sheets.

As hereinafter described, when the stacker conveyor frame 2 reaches its lowermost position, the electric circuit to the solenoids 88 and 92 is broken so that both said solenoids are deenergized and thus both the dump valve 87 and the by-pass valve 91 are again closed and fluid under pressure again flows into the cylinders 27 for raising the stacker conveyor frame 2 as heretofore described.

*The electrical controls*

Figure 12:
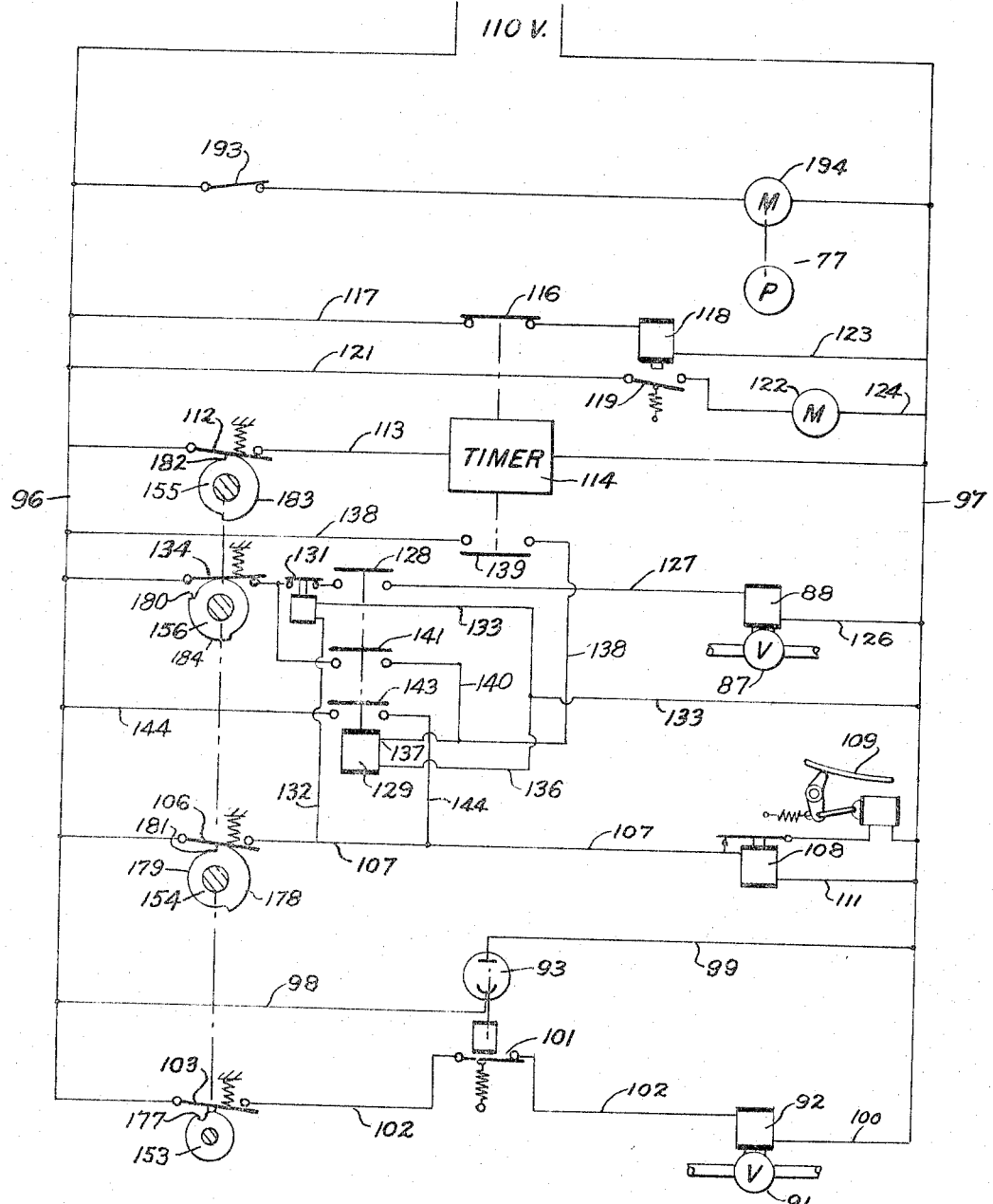
FIG. 12 is an electrical control wiring diagram for the fluid control of the stacker.

The electrical control circuit is shown in the wiring diagram in FIG. 12. This includes the opposite electric supply lines 96 and 97. The customary electric eye or light sensitive control 93 is interconnected by lines 98 and 99 respectively to supply lines 96 and 97 in the usual manner. The electric eye 93 actuates the normally open circuit breaker 101 which breaks or makes the circuit on a line 102 which connects one terminal of the by-pass valve solenoid 92 to the supply line 96. The other terminal of the by-pass solenoid valve 92 is connected by a line 100 to the other supply line 97 so that when the light beam of the electric eye device 93 is above the stack of sheets, the circuit breaker 101 is closed and the solenoid 92 is energized for opening the normally closed by-pass valve 91 and thereby holds the stack frame in its position until the stack of sheets reaches a height above the level of the electric eye device 93. The stack thus interrupts the operation of the electric eye 93 and permits the opening of the circuit breaker 101, thereby to deenergize the solenoid 92 and permit the closing of the by-pass valve 91 to allow the fluid under pressure to enter the cylinders 27 for further raising the stacking frame as heretofore described.

In view of the fact that the abutment wall 42 and the guide wall 43 extend below the top of the stack when the stack is completed to the desired height, it is necessary that the stacker frame rise further until the abutment wall 42 and guide wall 43 clear the top of the stack thereby to permit the removal of the completed stack. For this purpose a cam actuated switch 103 is connected in series in line 102. This cam actuated switch 103 is normally closed. Inasmuch as when the stack is completed to its full height the electric eye device 93 is below the top of the stack and the circuit breaker 101 is open, the by-pass valve 91 is closed and the stack frame raises upwardly. However, when the electric eye device 93 clears the top of the stack the circuit breaker 101 is closed to energize the solenoid 92 and open the by-pass valve 91. At this point the cam actuated switch 103 is opened by a cam to be hereinafter described to break the solenoid circuit and cause the closing of the by-pass valve 91 until the abutment wall 42 clears the top of stack, whereupon the cam actuated switch 103 is again closed to hold the stacker frame raised as heretofore described.

As the stacker conveyor frame 2 is held in this raised position, a normally open circuit breaker 106 is closed in the line 107 which connects supply line 96 to one terminal of a solenoid 108 which raises the braking slats 109 in the manner described in said Martin patent so as to stop the delivery of sheets from the sheet conveyors 15. The other terminal of the brake solenoid 108 is connected by a line 111 to the other supply line 97.

Substantially at the same time another normally open cam actuated switch 112 is closed by its cam in a manner hereinafter described to close the circuit through a line 113 between the supply line 96 and a timer switch device indicated at 114. This timer switch device closes a normally open conveyor actuating switch 116 which is in line 117 between the supply line 96 and a relay or a solenoid 118, which latter closes a conveyor switch 119 in line 121 between supply line 96 and one terminal of an electric motor 122 for operating the conveyor device 6 for carrying the stacked sheets away from the stacker. The other terminal of the relay 118 is connected by a line 123 to the other supply line 97. The other terminal of the conveyor motor 122 is connected by a line 124 to the other supply line 97.

The timer switch device 114 is of customary construction and is not shown in detail. It is set for a predetermined period necessary to carry the stack of sheets past the abutment wall 42 or a distance desired by the operator. When the set time expires the timer switch device 114 in the usual manner opens the switch 116 and thereby stops the operation of the conveyor. The normally open switch 112 is closed by its cam in the manner hereinafter described and is opened when the stacker is lowered.

In order to lower the stack conveyor frame 2 to its lowermost position, the dump valve solenoid 88 must be energized to open the dump valve 87. One terminal of the dump valve solenoid 88 is connected by a line 126 to supply line 97. The other terminal of the dump valve solenoid is connected to another line 127 which leads to the supply line 96. This latter line 127 is interrupted by three circuit breakers, all three of which must be closed before the dump valve is in operation. A normally open circuit breaker 128 is closed by a holding solenoid or relay 129. Another normally open circuit breaker or relay 131 has its solenoid energized through a line 132 connected to the normally dead side of brake circuit breaker 106. The other terminal of the solenoid of circuit breaker 131 is connected by a line 133 to supply line 97. Therefore this brake controlled circuit breaker 131 can be closed only when the slat brake 16 is set to prevent the delivery of sheets from the sheet conveyors 15. The third circuit breaker in line 127 is a normally closed switch 134, which is kept open by a cam to keep the dump valve solenoid circuit open during the upward travel of the stacker frame.

The holding solenoid 129 is connected by a line 136 to the supply line 97. The other terminal 137 of the holding solenoid 129 is connected by a line 138 to the supply line 96. This line 138 is interrupted by a circuit breaker 139 which is normally open. The circuit breaker 139 is controlled by the timer switch device 114 in the usual manner so as to operate simultaneously and oppositely to the timer operated switch 116. Namely, when switch 116 is closed and the conveyor device 6 is in operation, the circuit breaker 139 is open and keeps the holding solenoid 129 deenergized. When timer switch device 114 opens the switch 116 to stop operation of the conveyor device 6, the timer switch device 114 closes switch 139 momentarily to energize the holding solenoid 129 for closing the circuit breaker 128. Being that by this time the slat brake 16 is also operated, the other switch 131 in line 127 is closed and the dump valve solenoid 88 is thus energized and the dump valve 87 is opened for the lowering of the stacker frame 2. The terminal 137 of the holding solenoid 129 is connected by a line 140 to the line 127. A normally open circuit breaker 141 normally interrupts line 140, but when the holding solenoid 129 is momentarily energized by the timer controlled switch 139, the solentoid 129 simultaneously with the closing of the circuit breaker 128 also closes the circuit breaker 141 so as to keep itself energize until such time that the circuit in line 127 is broken.

The line 127 has connected in series therein the normally closed cam actuated switch 134. The cam of switch 134 opens the switch 134 when the stacker frame reaches its lowermost position thereby it brakes the circuit through line 127 and deenergizes dump valve solenoid 88 and also the holding solenoid 129, so that the circuit is ready for the next stacking operation.

The holding solenoid 129 also operates a third normally open circuit breaker 143 which interrupts a line 144 which latter shunts line 107 to supply line 96 whenever this third circuit breaker 143 is held closed by the holding solenoid 129. This keeps the slat brakes on, even though switch 106 may be open, until the stacker frame 2 returns to its lowermost position, whereupon switch 134 is opened to deenergize the holidng solenoid 129 and thereby allow circuit breakers 128, 141 and 143 to open.

*Cam device to actuate electric control circuit*

The hydraulic control system leading to the cylinders 27 is contained in a box frame 146 shown in FIGS. 3 and 8. On the side member 11, preferably on the same side where the hydraulic system's box frame 146 is located, is a box 147 which contains the relays, switches and electric circuits and from which lead the electric lines to the respective actuating devices. The supply lines 96 and 97 lead into this electric system box so as to form a compact unit which can be readily inspected.

Switches 103, 106, 112 and 134 are held in a fixed position in a cam box 148 mounted on the bracket plate 18 adjacent to and above box 147 so that the lead wires to the respective switches suitably extend from box 147 to the cam box 148.

Figure 13:
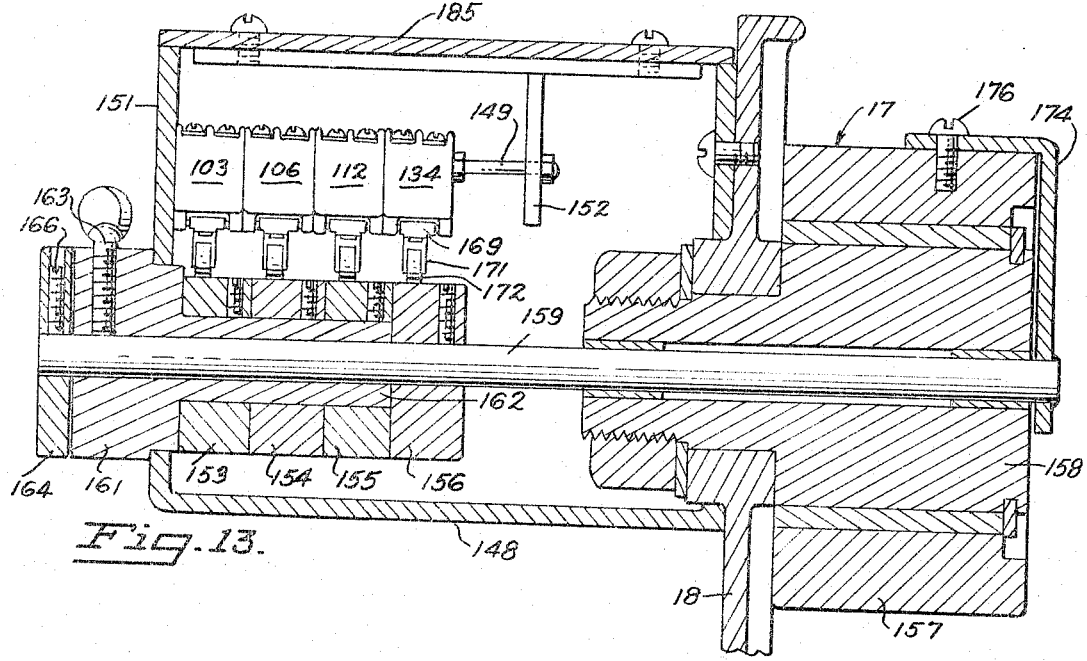
FIG. 13 is a sectional view of the cambox and the mounting of the cams and the cam actuated switches.

In the cam box 148 are mounted the circuit breakers 103, 106, 112 and 134, each of which is a so-called limit switch of the usual type. These switches are mounted on a support bolt 149 which bolt 149 in turn is mounted on a wall 151 and a bracket 152 of the box 148, as shown in FIG. 13.

A series of cams, 153, 154, 155 and 156 are arranged in series in registry with the respective switches 103, 106, 112 and 134 for actuating the switches as the cams are turned.

Each lever arm 17 has a hub 157 which is suitably journalled on a pivot pin 158, which latter is fixed on the respective bracket 18 and projects inwardly or toward the stacker frame 2.

The pivot pin 158 adjacent the cam box 148 has a cam shaft 159 journalled therein. The cam shaft 159 extends through the pivot pin 158, through the bracket plate 18 and through the walls of the cam box 148. In the outer wall 151 of the box 148 is journalled a cam head 161. A cam sleeve 162 extends from the cam head 161 inwardly of the box and surrounds the adjacent portion of the cam shaft 159. The cams 153, 154 and 155 are secured in pre-selected positions on the cam sleeve 162. The cam 156 is secured by a set screw directly to the cam shaft 159. An adjustment set screw 163 in the cam head 161 secures the cam head to the shaft 159. In this manner the positions of cams 153, 154 and 155 can be adjusted simultaneously by loosening the adjustment screw 163 and then turning the cam head 161 to the selected position. This adjustment is for predetermining the height to which sheets are stacked by the stacker. An indicator washer 164 is fixed by a set screw 166 on the end of the cam shaft 159 outside of the cam head 161. This washer 164 has a mark 167 on its periphery, shown in FIG. 14, fixed in a suitable position relatively to the cam adjustment, to be hereinafter described. On the periphery of the cam head 161 are a plurality of markings 168 corresponding to the positions of the cams for the different heights of stacks for which the cams are set.

Each of the switches 103, 106, 112 and 134 has a movable contact 169 from which extends a bearing yoke 171 with a roller 172 journalled therein. The roller 172 rides on the surface of the adjacent cam. The movable contact 169 is a spring contact which is resiliently yieldable, so that it is normally biased toward the adjacent cam periphery, thereby to hold the roller 172 in contact with the adjacent cam. In the switches 103, 106 and 112 the movable contact 169 is normally resiliently urged into circuit opening position away from its fixed contact 173. In switch 134 the relative position of the contacts is such that the movable contact 172 is biased toward a fixed contact. Each of the cams has suitable high peripheral parts and low or depressed peripheral parts. The high parts of cams 153, 154 and 155 keep the corresponding switches 103, 106 and 112 closed. The high part of cam 156 keeps switch 134 open.

Figure 14:
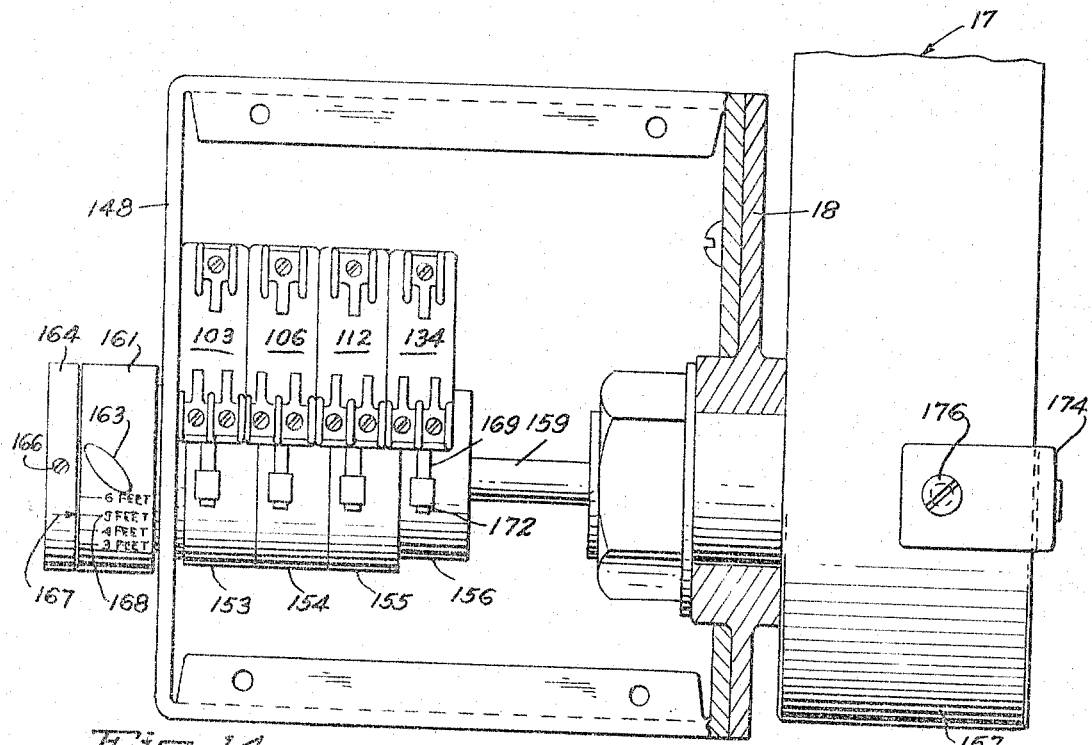
FIG. 14 is a partly sectional top plan view of the switches and the cam mechanism.

The relative adjustment of the cams is shown in FIG. 16. As shown in FIGS. 13 and 14, when the stacker is operated, the lever arm 17 is raised upwardly and the cams are turned with the cam shaft 159. This is accomplished by an arm 174 fixed on the inner end of the cam shaft 159. This arm 174 is bent at its free end over the periphery of the hub 157 and is attached by a screw 176 to the head 157 so that as the lever arm 17 turns it rotates the cam shaft 159 and correspondingly turns or rotates the cams 153, 154, 155 and 156 simultaneously. When the stacker frame 2 is raised for stacking sheets, the cams 153, 154, 155 and 156 are all turned in a counter-clockwise direction, viewing FIG. 16.

Cam 153 controls switch 103 which is kept normally closed by the periphery of the cam except for a depression 177. The stacker frame 2 rises and turns the cam 153 in counter-clockwise direction at all times during the rise and switch 103 is kept closed so as to permit the control of the bypass solenoid 92 by the electric eye 93 and its circuit breaker 101. But when the pre-determined height of stack is reached and the circuit breaker 101 is closed so as to open the by-pass valve and stop further rising of the stacker frame 2, then at that point the cam depression 177 is in registry with the roller 172 of switch 103 and thus the switch 103 is opened and breaks the electric circuit to the by-pass solenoid 92, and permits the by-pass valve 91 to close so that the stacker frame 2 rises to a sufficient distance to clear the abutment wall 42 above the stack of sheets. In the present embodiment the cam depression 177 is a width of about 6° which corresponds to the needed further raising of the stacker frame 2. After this sufficient raising is accomplished, the roller 172 of switch 103 rides out of the cam depression 177 on to the higher cam periphery and again closes the switch 103, thereby again opens the by-pass valve 91 and holds the stacker frame 2 in raised position.

Cam 154 has a peripheral high portion or rise 178 and a lower periphery or depressed portion 179 proportioned relatively to cam 153 so that the switch 106 is closed simultaneously with or shortly after the opening of the switch 103. For this purpose the leading end 181 of the rise 178 of cam 154 is retarded counter-clockwise at least one degree behind the cam depression 177 thereby to actuate the slat brake solenoid 108 and stop the delivery of sheets from the stacker just after the opening of switch 103. Thus no more sheets are fed on to the stack during the rise of the stacker frame 2 for clearing the abutment wall 42.

Cam 155 controls the switch 112 and closes the timer actuator switch 112 after the stacker frame 2 completed its extra rise to clear the abutment wall 42. For this purpose the leading end 182 of the peripheral rise 183 of the cam 155 is retarded in counter-clockwise direction viewing FIG. 16 about 6° with respect to the beginning of the cam depression 177 of cam 153. This is necessary to prevent the operation of the conveyor from moving the stack until after the stacker frame 2 is raised high enough to allow the stack to clear the abutment walls 42.

As heretofore described the timer switch device 114 first closes switch 116, but after sufficient lapse of time for the stack to be carried from under the abutment wall 42, the timer 114 operates in the usual manner to open the switch 116. Simultaneously with the opening of the switch 116 the timer switch device 114 momentarily closes the switch 139 and thus energizes the holder solenoid 129 thereby to open the dump valve 87 as heretofore described.

The dump valve 87 is then held open until the stacker frame 2 returns to its lowermost position. During this lowering movement the arm turns the cams 153, 154, 155 and 156 in a clockwise direction viewing FIG. 16 into the position where the rise 184 of cam 156 raises the movable contact 172 away from its fixed contact in switch 134 to break the circuit of the holder solenoid 129 as well as of the dump valve solenoid 88, thereby to close the dump valve 87. In this attitude the circuit breaker 131 is also open, de-energizing the slat brake solenoid 108 so that the delivery of sheets on to the stack is allowed to resume. As the stack rises the cams again turn in a counter-clockwise position toward positions shown in FIG. 16 as heretofore described.

The height of the stack can be adjusted by loosening the set screw 163 and then turning the cam head 161. If the cam head 161 and the cams 153, 154 and 155 therewith are turned in counter-clockwise direction viewing FIG. 16, the leading ends of the respective rises of the cams 154 and 155 and the depression 177 of cam 153 are brought closer to the respective switches 106 and 112 and will operate the same sooner and correspondingly will stop the stacking of sheets at a lower height. By turning the head 161 and the cams 153, 154 and 155 in a clockwise direction viewing FIG. 16, the actuating portions of the cams are retarded away from the respective switches and will operate the switches after a longer turn of the lever arm 17 and at a higher elevation of the discharge end of the stacker frame 2, thereby producing a higher stack.

The cam 156 is held secure on the cam shaft 159 and it determines the lowermost level of the discharge end of the stacker frame 2. To adjust this cam the top lid 185 of the cam box 148 is detached and access is gained to the said screw in the cam 156 for loosening it and thereby to allow the initial setting of cam 156. This initial adjustment is necessary to locate the discharge end of the stacker frame 2 at a suitable height above the conveyor pallet on which the sheets are stacked. Once the cam 156 is adjusted to the pallet used by the particular manufacturer or plant, the cam 156 rarely needs readjustment. The leading end 180 of the low or depressed part of cam 156 is advanced counter-clockwise with respect to the depression 177 of cam 153 so as to open the switch 134 after the stacker frame 2 reaches its lowermost position and then break the circuit of the dump valve solenoid 88.

*Operation*

Figure 10:
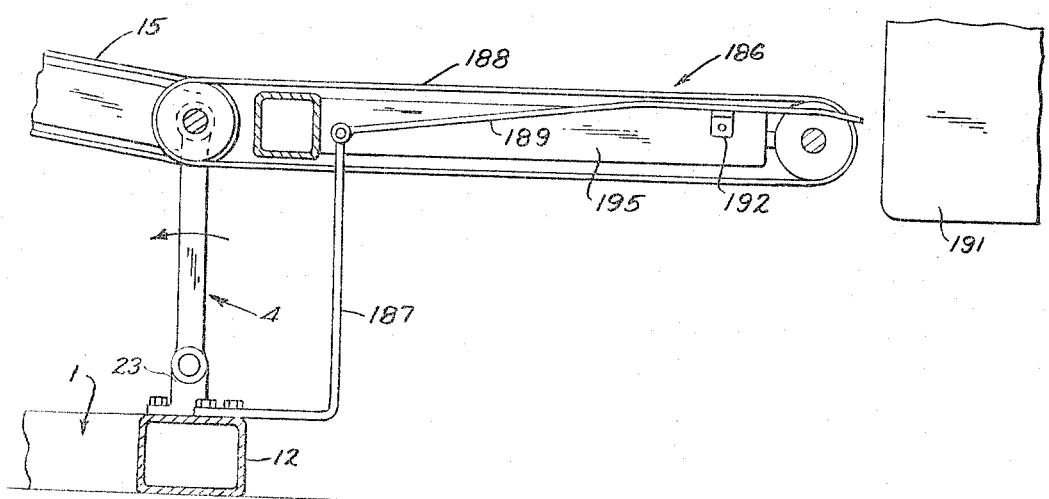
FIG. 10 is a fragmental, partly sectional view of the layboy end of the stacker, showing one of the sheet guides.

In operation the sheets are fed from the printer-slotter to the layboy 186 in the manner described in the aforesaid Martin patent. The only difference is the guard shown in FIG. 10. This guard has a fixed bar 187 mounted on the transverse member 12 of the base 1 and extends rearwardly and upwardly in the space between adjacent layboy conveyors 188. On the top of the bar 187 is hinged or pivoted a guard 189 which extends toward the printer-slotter indicated at 191 in FIG. 10. Each guard 189 is supported on a lateral finger 192 extended from the adjacent layboy frame member 193. There are usually two such guards arranged about one-fourth of the way from each side of the layboy 186.

As the electric current is turned on in the usual manner, for instance by a manual switch 193 shown on the wiring diagram in FIG. 12, it starts the electric motor 194 which starts the operation of the pump 77. Initially the by-pass solenoid 92 is deenergized by the electric eye device 91 opening the switch 101. The dump valve solenoid 88 is deenergized because cam 156 opens the switch 134. The fluid under pressure through the valve 74 flows up into the cylinders 27 to operate the pistons 26 for raising the lever arms 17 and elevate the discharge end of the stacker frame 2. As the lever arms 17 move around an arc about their fulcrums, the compensating levers 4 swing toward the stack and away from the printer-slotter 191.

The crank arms 41 through the links 39 turn the bracket plates 32 so as to maintain the outlet nozzles 34 of the manifold 31 parallel with the top of the stack. The angle of the crank arm 41 is determined according to the general proportions of the device. For example, when the stacker frame 2 is about 53¾" long, with the pivot of the lever arms 17 located at about 96" from the delivery end of the stacker frame, the lever arms being about 28" long, swinging on a fulcrum about 29" from the base, the compensating levers 4 being about 19" long with their fulcrum about 10" above the bottom of the base 1, the links 39 being about 98" long and are connected to the respective bracket plates 32 about 14¾" above the pivots of the respective bracket plates 32, the fixed angle of the crank arm 41 with regard to the lever arm 17 is about 105.2°. This directs the air cushion generally horizontally on top of the stack.

The layboy 186 moves with the swing of the compensating levers 4 away from the printer-slotter 191 and leaves a gap. The sheets fed from the printer-slotter 191 are prevented from falling into this gap by the guards 189 and thus are fed upon the layboy conveyors 188 and from there upon the stacker conveyors 15, whereby the sheets are carried to the discharge end of the stacker frame 2 and deposited on the top of the stack. The sheets are located properly on the stack against the abutment wall 42 and between the guide walls 43 which latter are preadjusted to the size of the sheets stacked. The blower 30, having been turned on in the usual manner, blows an air cushion through the manifold 31 and out through the outlet openings 36 so as to produce an air cushion under the sheets dropping from the sheet conveyors 15. In this manner the sheets gradually settle on the stack and smearing is prevented. Whenever the stack is below the light beam of the electric eye 93, the circuit breaker 101 is closed, and the switch 103, being kept closed throughout the rise of the stacker frame 2 by the cam 153, the by-pass solenoid 92 is energized and the by-pass valve 91 is opened so as to by-pass the fluid under pressure and thereby hold the stacker frame 2 in position until the stack interrupts the beam of the electric eye. Whenever the stack is high enough to interrupt the electric eye 93, the circuit breaker 101 is opened, the by-pass solenoid 92 is deenergized and the by-pass valve 91 is closed for further elevating the stacker frame 2. When the selected height of the stack is reached, cam 154 closes the switch 106 to operate the solenoid 108 of the slat brake in the manner described in said Martin patent so as to stop the feeding of the sheets on to the stack. The depressed portion 177 of cam 153 breaks the circuit of the by-pass solenoid 92 momentarily to close the by-pass valve 91 for further elevating the stacker frame 2 high enough for the abutment wall 42 to clear the top of the stack. After about 6° turning the cam 153 again opens the switch 103 thereby to hold the stacker frame in elevated position. Cam 155 then closes the switch 112 to energize the timer switch device 114 which closes the circuit breaker 116 and energizes the solenoid 118 to close the conveyor switch 119 and operate the conveyor motor 122 so that the conveyor device 6 carries the stack away from the stacker.

After a predetermined time the timer opens the circuit breaker 116 and closes the circuit breaker 139 to energize the holder solenoid 129 which closes the circuit to the pump valve solenoid 88 for opening the dump valve 87 and thereby lowering the stacker frame 2 to its initial starting position. The holding solenoid 129 energizes itself through switch 143 in the manner heretofore described. When the stacker frame reaches its lowermost position, the rise of cam 154 opens switch 143 which breaks the circuit of the holding solenoid and of the dump valve solenoid 88 as well as the slat brake solenoid 108 to resume the stacking operation as heretofore described.

I claim:
1. A machine for stacking sheets comprising
   (a) a base,
   (b) a stacker conveyor frame having an intake end and a stacking end,
   (c) means to swivably support said stacker frame on said base so that the stacking end of said stacker frame when elevated moves on a generally perpendicular plane relatively to said base,
   (d) conveyors on said stacker frame to convey sheets from the intake end to the stacking end of said stacker frame,
   (e) means connected to said support means to raise the stacking end of said stacker frame for stacking the sheets conveyed to said stacking end and to lower said stacker frame after a stack is completed,
   (f) means to control said raising and lowering means,
   (g) tubular side and end members integrally united to form said base in a generally U-shape, with a transverse member of said base being adjacent to the intake end of said stacker frame,
   (h) tubular transverse braces on said stacker frame to resist torsional distortion of said stacker frame.

2. A machine for stacking sheets comprising
   (a) a base,
   (b) a stacker conveyor frame having an intake end and a stacking end,
   (c) means to swivably support said stacker frame on said base so that the stacking end of said stacker frame when elevated moves on a generally perpendicular plane relatively to said base,
   (d) conveyors on said stacker frame to convey sheets from the intake end to the stacking end of said stacker frame,
   (e) means connected to said support means to raise the stacking end of said stacker frame for stacking the sheets conveyed to said stacking end and to lower said stacker frame after a stack is completed,
   (f) means to control said raising and lowering means,
   (g) means to produce an air cushion between the stacker end and the top of the stack of sheets, including, (h) spaced support elements pivoted on the stacker end,
(i) a manifold on said support elements,
(j) means to blow air under pressure through said manifold,
(k) discharge nozzles on said manifold discharging air from said manifold generally away from said stacker end,
(l) means of connection between said support means and said spaced support elements to turn said brackets in proportion to the angular change of attitude of said stacker conveyor frame thereby to maintain the direction of air flow from said nozzles generally in the same relation to the base in all positions of said stacker conveyor frame.

3. The machine for stacking sheets defined in claim 1 and
(g) a bracket extended upwardly from the base adjacent each side of the stacker frame,
(h) said swivably supporting means including a lifting lever fulcrumed on each bracket and inclined toward the intake end of the stacker frame and pivotally connected to the adjacent side of the stacker frame,
(i) a compensating lever pivoted on each side of the intake end of the stacker frame and fulcrumed on the base at such angle as to coact with said lifting lever for maintaining the stacker end of the stacker frame on a perpendicular plane during its upward movement,
(j) said raising means being connected to the respective lifting levers, so as to exert synchronized lifting force on both lifting levers,
(k) means to produce an air cushion between the stacker end and the top of the stack of sheets, including,
(l) spaced supporting elements pivoted on the stacker end,
(m) a manifold on said support elements extended transversely along the stacker end,
(n) discharge nozzles on said manifold discharging air generally away from said stacker end and beneath the sheets delivered from said stacker end,
(o) means to blow air through said manifold and said nozzles,
(p) a tilting member extended from each lifting lever,
(q) a link connecting each tilting member to one of said pivoted supporting elements, for tilting said supporting elements in accordance with the turning of the lifting lever,
(r) the angle of said tilting members relatively to the lifting levers, the length of the links, and the spacing of the ends of the links from the pivots of the support elements and from the pivots of the levers respectively being so proportioned that the tilting of the support elements maintains the direction of air flow from said nozzles substantially constant relatively to the top of the stack of sheets at said stacker end.

4. A machine for stacking sheets comprising
(a) a base,
(b) a stacker conveyor frame having an intake end and a stacking end,
(c) conveyors on said stacker frame to convey sheets from the intake end to the stacking end of the stacker frame,
(d) a bracket extended upwardly from the base adjacent each side of the stacker frame,
(e) a lifting lever fulcrumed on each bracket and inclined toward the intake end of the stacker frame and pivotally connected to the adjacent side of the stacker frame between said bracket and said intake end,
(f) a compensating lever pivoted on each side of the intake end of the stacker frame and fulcrumed on the base at such angle as to coact with said lifting lever for maintaining the stacker end of the stacker frame on a perpendicular plane during its upward movement,
(g) raising means operated by fluid under pressure on said base on each side of said stacker frame and connected to the adjacent lifting lever for turning said lifting levers thereby to raise said stacker frame,
(h) a pressure control device for admitting fluid under pressure into said raising means for raising the stacker frame and for relieving said pressure for lowering said stacker frame including
(i) a valve to connect a source of pressure medium to said raising means,
(j) a normally closed by-pass valve connected between said valve and said raising means to by-pass said pressure medium when the by-pass valve is opened,
(k) valve opening means for opening said by-pass valve to by-pass said pressure medium from said valve,
(l) checking means to check back flow of the pressure medium from said raising means thereby to hold said stacker frame in raised stacking attitude until said by-pass valve is closed.

5. The machine for stacking sheets defined in claim 4, and
(m) a normally closed dump valve connected between said checking means and said raising means to release said pressure medium when opened thereby to lower said raising means and said stacker conveyor frame,
(n) dump valve actuating means for opening said dumping valve to lower said stacker conveyor frame.

6. The machine for stacking sheets defined in claim 5, and
(o) means responsive to the height of the stack of sheets stacked by said stacker conveyor frame to actuate said by-pass valve opening means.

7. The machine for stacking sheets defined in claim 5, and
(o) light sensitive means movable with the stacking end of said stacker conveyor frame and at about the top of the stack of sheets to actuate said by-pass valve opening means when the height of said stack is below said light sensitive means for opening said by-pass valve, thereby to stop the raising of said stacker conveyor frame until the height of the stack is above the level of and obstructs the light of said light sensitive means.

8. The machine for stacking sheets defined in claim 5, and
(o) light sensitive means movable with the stacking end of said stacker conveyor frame and at about the top of the stack of sheets to actuate said by-pass valve opening means when the height of said stack is below said light sensitive means for opening said by-pass valve, thereby to stop the raising of said stacker conveyor frame until the height of the stack is above the level of and obstructs the light of said light sensitive means.

9. In a machine for stacking sheets,
(a) a base,
(b) a stacker for feeding sheets to form a stack,
(c) means to support the stacker on the base with freedom of rising movement for stacking the sheets fed by the stacker,
(d) raising means operated by fluid under pressure to raise said stacker to follow the height of the stacked sheets,
(e) fluid pressure control means for said raising means including
(f) normally closed by-pass means for by-passing the fluid thereby to stop said raising means,
(g) check means to prevent back flow of fluid from said raising means while the fluid under pressure is by-passed so as to hold the stacker in its raised position, (h) normally closed pump means to drain said fluid from said raising means so as to lower said stacker,
(i) by-pass actuating means to open said by-pass means whenever said stacker is above the stack,
(j) dump actuating means for opening said dump means for lowering said raising means and said stacker.

10. In a machine for stacking sheets defined in claim 9, and
(k) conveyor means on said stacker for feeding sheets on said stacker to said stack.
(l) means coacting with said dump-actuating means to prevent feeding of said sheets from said stacker during the lowering of said stacker.

11. In a machine for stacking sheets defined in claim 9, and
(k) said by-pass actuating means including an actuator responsive to the height of the stack.

12. In a machine for stacking sheets,
(a) a base,
(b) a stacker frame having an intake end and a stacker end,
(c) lever means to swivelably support said stacker frame on said base with freedom of raising and lowering said stacker end,
(d) conveyor means on said stacker frame carrying the sheets from the intake end to the stacker end,
(e) fluid pressure operated mechanisms on each side of said stacker frame for swinging said stacker frame for raising said stacker end,
(f) means to supply fluid pressure to said mechanisms so as to operate said mechanisms in synchronism,
(g) and means on the stacker end of the stacker frame actuated by the height of the stack adjacent said stacker end to stop and start said mechanisms.

13. In a machine for stacking sheets defined in claim 12, and
(h) said responsive means including light actuated electrical control for said fluid supply means to said mechanisms actuated by the incidence of light relatively to the sheets at or above the top of the stack so as to stop said raising mechanisms when said light is unobstructed by said stack and to start said mechanisms when said light is obstructed by said stack.

14. In a machine for stacking sheets as defined in claim 13, and
(i) means to prevent the escape of the fluid under pressure from said raising mechanisms when said mechanisms are stopped so as to prevent the lowering of said stacker frame,
(j) and means for draining said fluid pressure from said mechanisms thereby to lower said stacker frame.

15. In a machine for stacking sheets
(a) a base,
(b) a stacker frame having an intake end and a stacker end,
(c) swingable means to support said stacker frame on said base whereby the stacker end of said stacker frame is movable on a generally perpendicular plane for stacking the sheets,
(d) conveyor means on said stacker frame conveying the sheets from the intake end to the stacker end,
(e) a fluid operated reciprocating raising device pivotally connected to said base and to said swingable support means for swinging said support means thereby to move the stacker frame and raise said stacker end,
(f) means to supply fluid under pressure to said reciprocating raising means,
(g) a normally closed by-pass valve connected between said supply means and said reciprocating means,
(h) by-pass actuating means to open said by-pass valve thereby to stop the fluid pressure supply to said reciprocating means and stop the raising of said stacker frame,
(i) a check valve connected between said by-pass valve and said reciprocating means for preventing back flow of the pressure medium from said reciprocating means thereby to hold said stacker frame in the position to which the stacker frame was raised by said reciprocating means,
(j) normally closed drain valve to drain the fluid from said reciprocating means under the pressure of the weight of said stacker frame,
(k) drain actuating means to open said drain valve thereby to lower said stacker frame.

16. In a machine for stacking sheets as defined in claim 15 and
(l) a normally inactive break-device on the stacker frame for stopping the delivery of sheets from said stacker end,
(m) break actuating means coacting with said drain actuating means for actuating said break-device to stop the delivery of sheets during the lowering of said stacker frame.

17. In a machine for stacking sheets,
(a) a base,
(b) a stacker frame, having an intake end and a stacker end,
(c) conveyor means to convey sheets from the intake end to the stacker end,
(d) a pair of opposite brackets extended from the base at opposite sides of the frame,
(e) a lever pivoted on each bracket and extended toward the intake end of the stacker frame and being pivotally secured to the stacker frame,
(f) a fluid pressure operated lifting device on each side of the base connected to the adjacent lever to turn said lever about the lever pivot on the bracket thereby to lift the stacker frame to raise the stacker end for stacking the sheets,
(g) means to supply fluid under pressure to said lifting device,
(h) control means to control said supply of fluid including,
(i) a system of conduits to convey fluid under pressure from said supply means to said lifting devices in synchronism,
(j) a normally closed by-pass valve interconnected in said system of conduits,
(k) by-pass actuating means for opening said by-pass valve thereby to prevent fluid under pressure to flow to said lifting devices,
(l) a check valve interconnected in said system of conduits between said by-pass valve and said lifting devices for preventing back-flow of fluid from said lifting devices when said by-pass valve is open, thereby to hold said stacker frame in the raised position,
(m) normally inoperative means to drain said fluid from said lifting devices for lowering said stacker frame.

18. In a machine for stacking sheets as defined in claim 17, and
(n) said draining means being a normally closed dump valve interconnected in said system of conduits between said check valve and said lifting devices,
(o) drain actuating means for opening said dump valve for lowering said stacker frame.

19. A stacker device defined in claim 17, and
(n) said by-pass actuating means being responsive to the height of the stack,
(o) drain actuating means opening said draining means for lowering said stacker frame.

20. A machine defined in claim 19, and
(p) said by-pass actuating means being electrically operated,
(q) said drain actuating means being electrically operated, (r) an electric circuit supplying electric current to said by-pass actuating means and to said drain actuating means, including
(s) means in said electric circuit responsive to the height of the stack relatively to the delivery end of the stacker frame to activate said by-pass actuating means at a predetermined relative height of the stack,
(t) a cam actuated switch in said electric circuit to actuate said drain actuating means.

21. In a machine for stacking sheets,
(a) a base,
(b) a stacker frame having an intake end and a stacker end,
(c) conveyor means on the stacker frame to convey sheets from the intake end to the stacker end,
(d) swivelable support means supporting said stacker frame on said base with freedom of movement for raising said stacker end for stacking the sheets issuing from said delivery end,
(e) said support means including raising means operated by fluid under pressure for raising the stacker end of said stacker frame,
(f) supply means for supplying fluid under pressure to said raising means,
(g) a system of conduits connecting said supply means to said raising means,
(h) a normally closed by-pass valve interconnected in said system of conduits to stop the raising of the stacker frame when said valve is open,
(i) a check valve interconnected between said by-pass valve and said raising means to prevent return flow of said fluid from said raising means when said by-pass valve is open, thereby to hold said stacker frame in raised attitude,
(j) a normally closed dump valve interconnected between said check valve and said raising means for draining, when opened, the fluid from said raising means thereby to lower said stacker frame,
(k) electrical by-pass actuating means for opening said by-pass valve thereby to stop the raising of said stacker frame,
(l) electrical drain actuating means for opening said dump valve thereby to lower said stacker frame.

22. The machine for stacking sheets defined in claim 21, and
(m) an electric circuit for supplying electric current to said electrical actuating means,
(n) light responsive means in said electric circuit coacting with the height of the stack relatively to said delivery end to operate said by-pass actuating means to open said by-pass valve,
(o) a first cam actuated switch in said electric circuit to close the circuit to said drain actuating means for opening said dump valve and lowering said stacker frame,
(p) means to move said cam in accordance with the movement of said stacker frame so as to open said dump valve at a predetermined height of the stack.

23. The machine for stacking sheets defined in claim 21, and
(m) an electric circuit for supplying electric current to said electrical actuating means,
(n) light responsive means in said electric circuit coacting with the height of the stack relatively to said delivery end to operate said by-pass actuating means to open said by-pass valve,
(o) a first cam actuated switch in said electric circuit to close the circuit to said drain actuating means for opening said dump valve and lowering said stacker frame,
(p) means to move said cam in accordance with the movement of said stacker frame so as to open said dump valve at a predetermined height of the stack,
(q) an electrically operated brake device on said stacker frame to prevent the sheets from delivery from said stacker end,
(r) a second cam actuated switch in said electric circuit to operate said brake at a predetermined height of the stack.

24. The machine for stacking sheets defined in claim 21, and
(m) an electric circuit for supplying electric current to said electrical actuating means,
(n) light responsive means in said electric circuit coacting with the height of the stack relatively to said delivery end to operate said by-pass actuating means to open said by-pass valve,
(o) a first cam actuated switch in said electric circuit to close the circuit to said drain actuating means for opening said dump valve and lowering said stacker frame,
(p) means to move said cam in accordance with the movement of said stacker frame so as to open said dump valve at a predetermined height of the stack,
(q) an electrically operated brake device on said stacker frame to prevent the sheets from delivery from said stacker end,
(r) a second cam actuated switch in said electric circuit to operate said brake at a predetermined height of the stack,
(s) adjustable abutment means moving with said stacking end for aligning said sheets on the top of the stack,
(t) a third cam actuated electric means in said electric circuit to keep the by-pass valve closed at said predetermined height of the stack for further raising said stacker end until said abutment means clears the top of the stack,
(u) a conveyor under the delivery end of said stacker frame for carrying the stack of sheets away from said stacking end.

25. The machine for stacking sheets defined in claim 21, and
(m) an electric circuit for supplying electric current to said electrical actuating means,
(n) light responsive means in said electric circuit coacting with the height of the stack relatively to said delivery end to operate said by-pass actuating means to open said by-pass valve,
(o) a first cam actuated switch in said electric circuit to close the circuit to said drain actuating means for opening said dump valve and lowering said stacker frame,
(p) means to move said cam in accordance with the movement of said stacker frame so as to open said dump valve at a predetermined height of the stack,
(q) an electrically operated brake device on said stacker frame to prevent the sheets from delivery from said stacker end,
(r) a second cam actuated switch in said electric circuit to operate said brake at a predetermined height of the stack,
(s) adjustable abutment means moving with said stacking end for aligning said sheets on the top of the stack,
(t) a third cam actuated electric means in said electric circuit to keep the by-pass valve closed at said predetermined height of the stack for further raising said stacker end until said abutment means clears the top of the stack,
(u) a conveyor under the delivery end of said stacker frame for carrying the stack of sheets away from said stacking end,
(v) a timing device in said circuit for rendering the last mentioned conveyor operative after said abutment means cleared the top of said stack.

26. The machine for stacking sheets defined in claim 21, and (m) an electric circuit for supplying electric current to said electrical actuating means,
(n) light responsive means in said electric circuit co-acting with the height of the stack relatively to said delivery end to operate said by-pass actuating means to open said by-pass valve,
(o) a first cam actuated switch in said electric circuit to close the circuit to said drain actuating means for opening said dump valve and lowering said stacker frame,
(p) means to move said cam in accordance with the movement of said stacker frame so as to open said dump valve at a predetermined height of the stack,
(q) an electrically operated brake device on said stacker frame to prevent the sheets from delivery from said stacker end,
(r) a second cam actuated switch in said electric circuit to operate said brake at a predetermined height of the stack,
(s) adjustable abutment means moving with said stacking end for aligning said sheets on the top of the stack,
(t) a third cam actuated electric means in said electric circuit to keep the by-pass valve closed at said predetermined height of the stack for further raising said stacker end until said abutment means clears the top of the stack,
(u) a conveyor under the delivery end of said stacker frame for carrying the stack of sheets away from said stacking end,
(v) a timing device in said circuit for rendering the last mentioned conveyor operative after said abutment means cleared the top of said stack,
(w) means in said electric circuit co-acting with said timing device and with said electrical drain actuating means to keep said drain actuating means inactive during the operation of said conveyor and to activate said drain actuating means after a predetermined time of operation of said last mentioned conveyor.

27. The machine for stacking sheets defined in claim 21, and
(m) an electric circuit for supplying electric current to said electrical actuating means,
(n) light responsive means in said electric circuit coacting with the height of the stack relatively to said delivery end to operate said by-pass actuating means to open said by-pass valve,
(o) a first cam actuated switch in said electric circuit to close the circuit to said drain actuating means for opening said dump valve and lowering said stacker frame,
(p) means to move said cam in accordance with the movement of said stacker frame so as to open said dump valve at a predetermined height of the stack,
(q) an electrically operated brake device on said stacker frame to prevent the sheets from delivery from said stacker end,
(r) a second cam actuated switch in said electric circuit to operate said brake at a predetermined height of the stack,
(s) adjustable abutment means moving with said stacking end for aligning said sheets on the top of the stack,
(t) a third cam actuated electric means in said electric circuit to keep the by-pass valve closed at said predetermined height of the stack for further raising said stacker end until said abutment means clears the top of the stack,
(u) a conveyor under the delivery end of said stacker frame for carrying the stack of sheets away from said stacking end,
(v) a timing device in said circuit for rendering the last mentioned conveyor operative after said abutment means cleared the top of said stack,
(w) means in said electric circuit coacting with said timing device and with said electrical drain actuating means to keep said drain actuating means inactive during the operation of said conveyor and to activate said drain actuating means after a predetermined time of opertion of said last mentioned conveyor,
(x) means in said electric circuits co-ordinated with said drain actuating means to keep said brake device operative during the lowering of the stacker frame,
(y) means to render said drain actuating means inoperative and release said brake device when the stacker frame is lowered to a predetermined initial position for stacking sheets.

28. The machine defined in claim 26, and
(x) means in said electric circuits co-ordinated with said drain actuating means to keep said brake device operative during the lowering of the stacker frame.

29. In a stacker machine for stacking sheets,
(a) a stacker frame having a stacker end,
(b) means on the stacker frame for moving the sheets thereon to the stacker end to be discharged for stacking,
(c) means adjustably to support said stacker frame for raising and lowering the stacker end in a substantially perpendicular plane between an initial lowermost position and a top position thereby to stack the sheets to a predetermined height,
(d) controlled power means for raising and lowering said support means,
(e) carrier means at said stacker end on which the sheets are stacked adapted to carrying the completed stack of sheets away from said stacker end,
(f) aligning means opposite said stacker end engaged by the sheets delivered from said stacker end thereby to register the sheets with the stack,
(g) means to stop the delivery of sheets from said stacker end at a predetermined height of the stack,
(h) control means to actuate said power means to raise said stacker end and said aligning means beyond said predetermined height until said aligning means clears the top level of the stack thereby to permit the carrying away of the completed stack.

30. The machine defined in claim 29, and said aligning means including
(i) abutment elements spaced from said opposite to said stacker end and movable with said stacker end in the path of the sheets issuing from said stacker end so as to stop said sheets in a perpendicularly registering position relatively to the stack,
(j) side guides registering with the sides of the stack and movable with said abutment elements to register the adjacent sides of the sheets with the stack.

31. The sheet stacking machine defined in claim 29, and
(i) adjustment means for said aligning means, including
(j) support brackets pivotally held on the stacker frame,
(k) support bars longitudinally slidably held on said brackets,
(l) a cross member on said bars spaced from said brackets,
(m) means to adjustably mount said aligning means on said cross member for adjustment to the width of the sheets being stacked,
(n) manipulable means on said brackets connected to said bars for sliding the bars simultaneously in said brackets for adjusting the spacing of said cross member from said stacking end to conform to the sheets being stacked,
(o) and a device connecting said brackets to said stacker frame support means to turn said pivoted brackets in proportion to the change of the angular position of said stacker frame thereby to maintain said alignment means in the same vertical plane in which said stack is formed.

32. The sheet stacking machine defined in claim 31, and
(p) a manifold extended transversely across the stacker end and mounted on said support brackets,
(q) air outlets from said manifold discharging air flow away from said stacker end and below the level at which the sheets are discharged from said stacker end,
(r) means to blow air through said manifold and said outlets,
(s) said device connecting said brackets to said stacker frame support being so related to said air outlets as to maintain the direction of air flow from said air outlets substantially constant relatively to said stack.

33. In a machine for stacking sheets,
(a) a base,
(b) a stacker frame,
(c) conveyor means on the stacker frame to convey sheets to a stacker end of said frame for stacking,
(d) brackets on the base at each side of the stacker frame,
(e) a lifting lever pivotally secured to each side of the frame,
(f) pivot means in each bracket for pivoting the adjacent lever on the bracket,
(g) fluid pressure operated means on said base connected to each lever for supporting said stacker frame and for turning said levers to raise said stacker frame thereby to stack the sheets delivered at said stacker end,
(h) a fluid pressure control system for controlling the supply of fluid under pressure to said fluid pressure operated means, including
(i) a manipulable valve,
(j) a normally closed by-pass valve between said manipulable valve and said fluid pressure operated means,
(k) a check valve between said by-pass valve and said fluid pressure operated means for holding the fluid in said fluid pressure operating means when said by-pass valve is opened,
(l) a normally closed dump valve between said check valve and said fluid pressure operated means, when opened to drain the fluid from said fluid pressure operated means thereby to lower said stacker frame,
(m) electrically operated carrier means at said stacker end for holding the stacked sheets during stacking,
(n) electrical actuating means responsive to the height of the stack for opening said by-pass valve thereby to stop the raising of said stacker frame whenever the stacker end is raised above the top of the stack and to close said by-pass valve for raising said stacker end whenever the stacker end is below the top of the stack,
(o) electrical actuating means to open said dump valve for draining the fluid from said fluid pressure operated means thereby to lower said stacker frame,
(p) electrical timing means to operate said carrier means for a predetermined period to carry the stacked sheets away from said stacker end,
(q) a first cam actuated switch for said electrical actuating means for the dump valve,
(r) a second cam actuated switch for said electrical timing means,
(s) cams for said cam actuated switches,
(t) means co-ordinated with the turning of said lifting levers to operate said cams,
(u) said cams being set in such relation to one another and to said lifting levers that said second cam actuates said timing device and said carrier means at above a predetermined height of the stack, and said first cam actuated switch is closed at about said predetermined height of the stacked sheets and remains closed until the stacker frame is lowered to a predetermined initial low position.

34. The sheet stacking machine defined in claim 33, and
(v) electrical connecting means between said timing device and said electrical actuating means for said dump valve to prevent opening of said dump valve until after said stack of sheets is carried away from said stacker end, 35. The sheet stacking machine defined in claim 33, and
(v) electrical connecting means between said timing device and said electrical actuating means for said dump valve to prevent opening of said dump valve until after said stack of sheets is carried away from said stacker end,
(w) electrically operated brake means on said stacker frame to stop delivery of sheets from said stacker end,
(x) a third cam actuated switch to actuate said electrically operated means for operating said brake means,
(y) a cam for said third actuated means co-ordinated with said cams so as to operate said third cam actuated switch for operating said brake means to stop the sheets on the stacker frame at said predetermined height of the stack of sheets,
(z) second electrical connecting means between said electrical actuating means for the dump valve and said electrically operated brake means to hold the brake means in braking attitude while the stacker frame is lowered to said initial position.

36. The sheet stacking machine defined in claim 33, and
(v) electrical connecting means between said timing device and said electrical actuating means for said dump valve to prevent opening of said dump valve until after said stack of sheets is carried away from said stacker end.
(w) electrically operated brake means on said stacker frame to stop delivery of sheets from said stacker end,
(x) a third cam actuated switch to actuate said electrically operated means for operating said brake means,
(y) a cam for said third actuated means co-ordinated with said cams so as to operate said third cam actuated switch for operating said brake means to stop the sheets on the stacker frame at said predetermined height of the stack of sheets,
(z) second electrical connecting means between said electrical actuating means for the dump valve and said electrically operated brake means to hold the brake means in braking attitude while the stacker frame is lowered to said initial position.
(aa) aligning means on said stacker end engaged by the sheets discharged from said stacker end for aligning the sheets in a generally vertical stack,
(bb) a fourth cam actuated switch to momentarily close said by-pass valve,
(cc) the cam for said fourth cam actuated switch being co-ordinated with said lifting lever and with the other cams so as to actuate the fourth cam actuated switch at about said predetermined height of said stack of sheets for a sufficient period to raise said stacker end and said aligning means above said predetermined height to allow said stack to clear said aligning means, prior to the operation of said stack carrying means.

37. The sheet stacking machine defined in claim 36, and
(dd) said means for operating said cams, including
(ee) a cam shaft connected to one of said lifting levers so as to be turned therewith,
(ff) a cam sleeve on said cam shaft, the cams for the second, third and fourth cam actuated switches being mounted on said sleeve in predetermined relation,
(gg) the cam for the first cam actuated switch for the dump valve being mounted on said cam shaft,
(hh) means to mount the cam actuated switches respectively in fixed position in operative relation to the respective cams.

38. The sheet stacking machine defined in claim 36, and
(dd) said means for operating said cams, including
(cc) a cam shaft connected to one of said lifting levers so as to be turned therewith,
(ff) a cam sleeve on said cam shaft, the cams for the second, third and fourth cam actuated switches being mounted on said sleeve in predetermined relation,
(gg) the cam for the first cam actuated switch for the dump valve being mounted on said cam shaft,
(hh) means to mount the cam actuated switches respectively in fixed position in operative relation to the respective cams,
(ii) adjusting means on said sleeve whereby the sleeve is turned for adjusting the cams relatively to the second, third and fourth cam actuating switches for determining the height of the stack,
(jj) and releasable means to secure said adjusting sleeve in the adjusted position.

39. In a machine for stacking sheets issuing from a printer slotter,
(a) a base,
(b) a stacker frame having an intake end and a stacker end,
(c) support means to swivelably support said stacker frame on said base,
(d) lifting means for raising said stacker frame for moving the stacker end in a generally perpendicular plane for stacking the sheets,
(e) compensating support means at the intake end of the stacker frame swingable with the stacker frame toward the stacker end for compensating for the shifting of the stacker frame during upward movement of the stacker end,
(f) conveyor means on said stacker frame to convey the sheets from the intake end of the stacker end,
(g) a lay-boy on the intake end of the stacker frame for receiving the sheets from the printer-slotter, said lay-boy shifting with said stacker frame,
(h) fixed guards extending from the base and being positioned at about the initial level of said lay-boy for supporting the sheets delivered from the printer-slotter when said lay-boy is shifted away from the printer-slotter with said stacker frame.

References Cited by the Examiner
UNITED STATES PATENTS

| | | | |
|---|---|---|---|
| 1,305,501 | 6/1919 | Steele | 271—68 |
| 2,642,221 | 6/1953 | Offutt et al. | 214—6 X |
| 2,901,250 | 8/1959 | Martin | 271—68 |
| 3,030,107 | 4/1962 | Stidwill | 271—68 |

M. HENSON WOOD, JR., *Primary Examiner.*

ALLEN N. KNOWLES, *Examiner.*

Disclaimer and Dedication 3,321,202.—*Merrill D. Martin*, Oakland, Calif. AUTOMATIC SHEET STACKERS. Patent dated May 23, 1967. Disclaimer and Dedication filed Mar. 16, 1977, by the inventor.

Hereby disclaims and dedicates all the claims of said patent.

[*Official Gazette November 18, 1980.*]